(12) United States Patent
Anderson et al.

(10) Patent No.: US 6,912,311 B2
(45) Date of Patent: Jun. 28, 2005

(54) CREATION AND USE OF COMPLEX IMAGE TEMPLATES

(75) Inventors: Eric C. Anderson, San Jose, CA (US); John F. Pavley, Cupertino, CA (US); Bruce W. Southwick, San Jose, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 1072 days.

(21) Appl. No.: 09/107,920

(22) Filed: Jun. 30, 1998

(65) Prior Publication Data
US 2003/0206316 A1 Nov. 6, 2003

(51) Int. Cl.[7] .............................. G06K 9/62; G06K 9/34; G06F 15/00
(52) U.S. Cl. ...................... 382/209; 382/180; 358/1.11; 358/1.17; 358/1.18
(58) Field of Search ................................. 382/282, 284, 382/209, 217, 218, 180; 345/435, 437, 438, 439, 113, 114; 358/1.9, 1.11, 1.12, 1.13, 1.14, 1.15, 1.16, 1.17, 1.18; 707/522

(56) References Cited

U.S. PATENT DOCUMENTS

| | | | | |
|---|---|---|---|---|
| 5,459,586 A | * | 10/1995 | Nagasato et al. | 358/450 |
| 5,477,264 A | | 12/1995 | Sarbadhikari et al. | 348/231 |
| 5,544,290 A | * | 8/1996 | Gentile | 395/115 |
| 5,563,991 A | * | 10/1996 | Mahoney | 395/133 |
| 5,577,179 A | * | 11/1996 | Blank | 395/135 |
| 5,581,670 A | * | 12/1996 | Bier et al. | 395/326 |
| 5,594,850 A | * | 1/1997 | Noyama et al. | 395/135 |
| 5,600,768 A | * | 2/1997 | Andersen | 395/135 |
| 5,638,499 A | * | 6/1997 | O'Connor et al. | 395/131 |
| 5,638,501 A | * | 6/1997 | Gough et al. | 395/135 |
| 5,640,496 A | * | 6/1997 | Hardy et al. | 395/121 |
| 5,729,665 A | * | 3/1998 | Gauthier | 395/117 |
| 5,761,686 A | * | 6/1998 | Bloomberg | 707/529 |
| 5,831,622 A | * | 11/1998 | Ayala | 345/423 |
| 5,838,333 A | * | 11/1998 | Matsuo | 345/431 |
| 5,845,302 A | * | 12/1998 | Cyman, Jr. et al. | 707/517 |
| 5,909,673 A | * | 6/1999 | Gregory | 705/45 |
| 5,956,737 A | * | 9/1999 | King et al. | 707/517 |
| 5,970,216 A | * | 10/1999 | Tanio et al. | 395/112 |
| 6,006,281 A | * | 12/1999 | Edmunds | 710/1 |
| 6,014,147 A | * | 1/2000 | Politis et al. | 3456/435 |
| 6,195,101 B1 | * | 2/2001 | Ghislain Bossut et al. | 345/433 |
| 6,222,637 B1 | * | 4/2001 | Ito et al. | 358/1.18 |
| 6,243,172 B1 | * | 6/2001 | Gauthier et al. | 358/1.18 |

OTHER PUBLICATIONS

US 5,892,534, 4/1999, Maruyama et al. (withdrawn)*

* cited by examiner

Primary Examiner—Mehrdad Dastouri
(74) Attorney, Agent, or Firm—Sawyer Law Group LLP

(57) ABSTRACT

The present invention provides a method and system for the creation and use of simple and complex templates. The system includes providing the template where the template contains a plurality of tags, and then applying the template to the image based on the tags. The plurality of tags provide instructions for the application of a plurality of plane files to be applied to the image. The method and system in accordance with the present invention automates the process of applying templates to images which reduces the required amount of user time for the interface. Its use of tags to store the template requires less storage space. The method and system in accordance with the present invention thus saves the user considerable time and effort in applying templates. It also require less processing time over manual template creation methods.

21 Claims, 30 Drawing Sheets

700

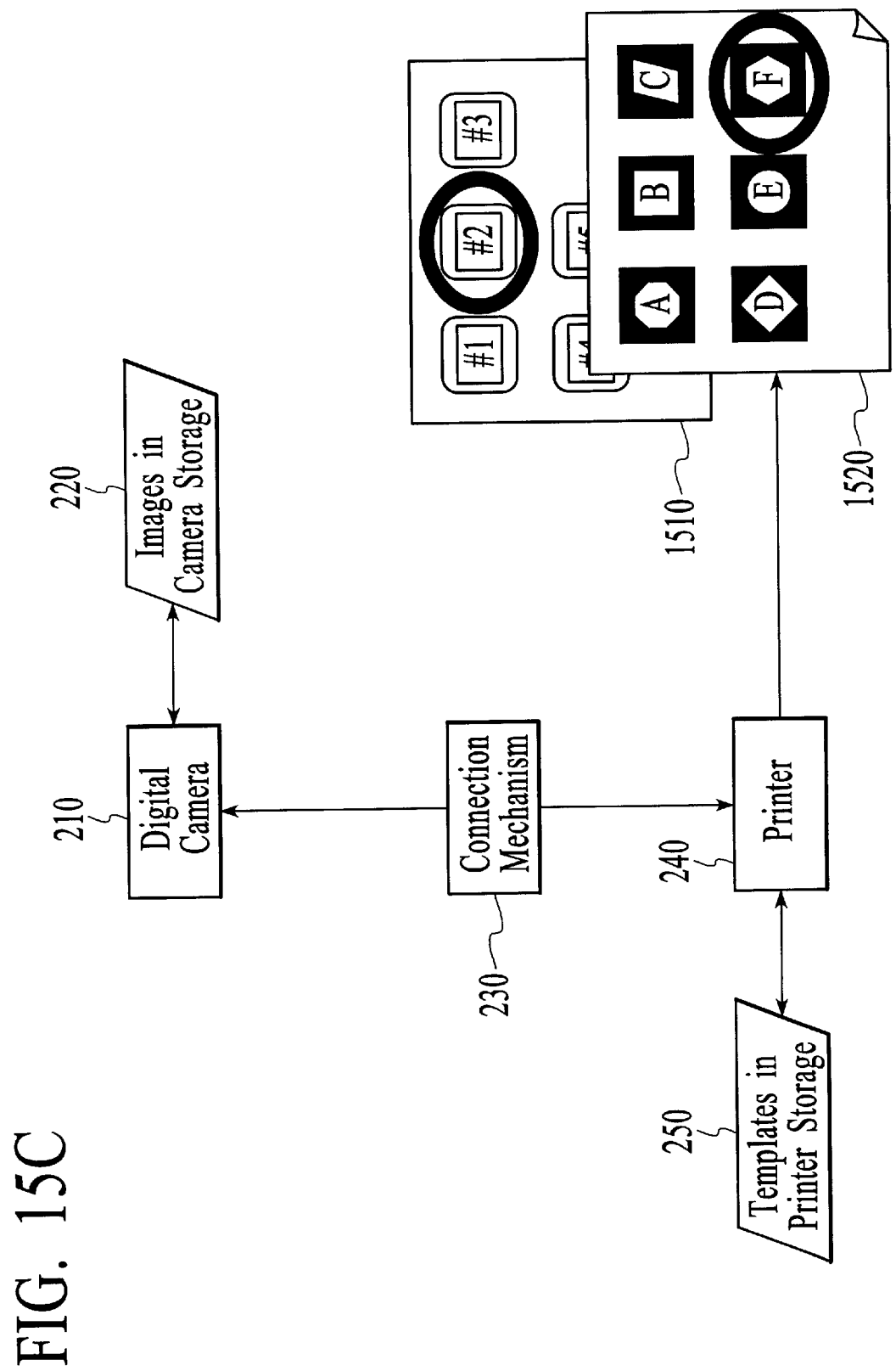

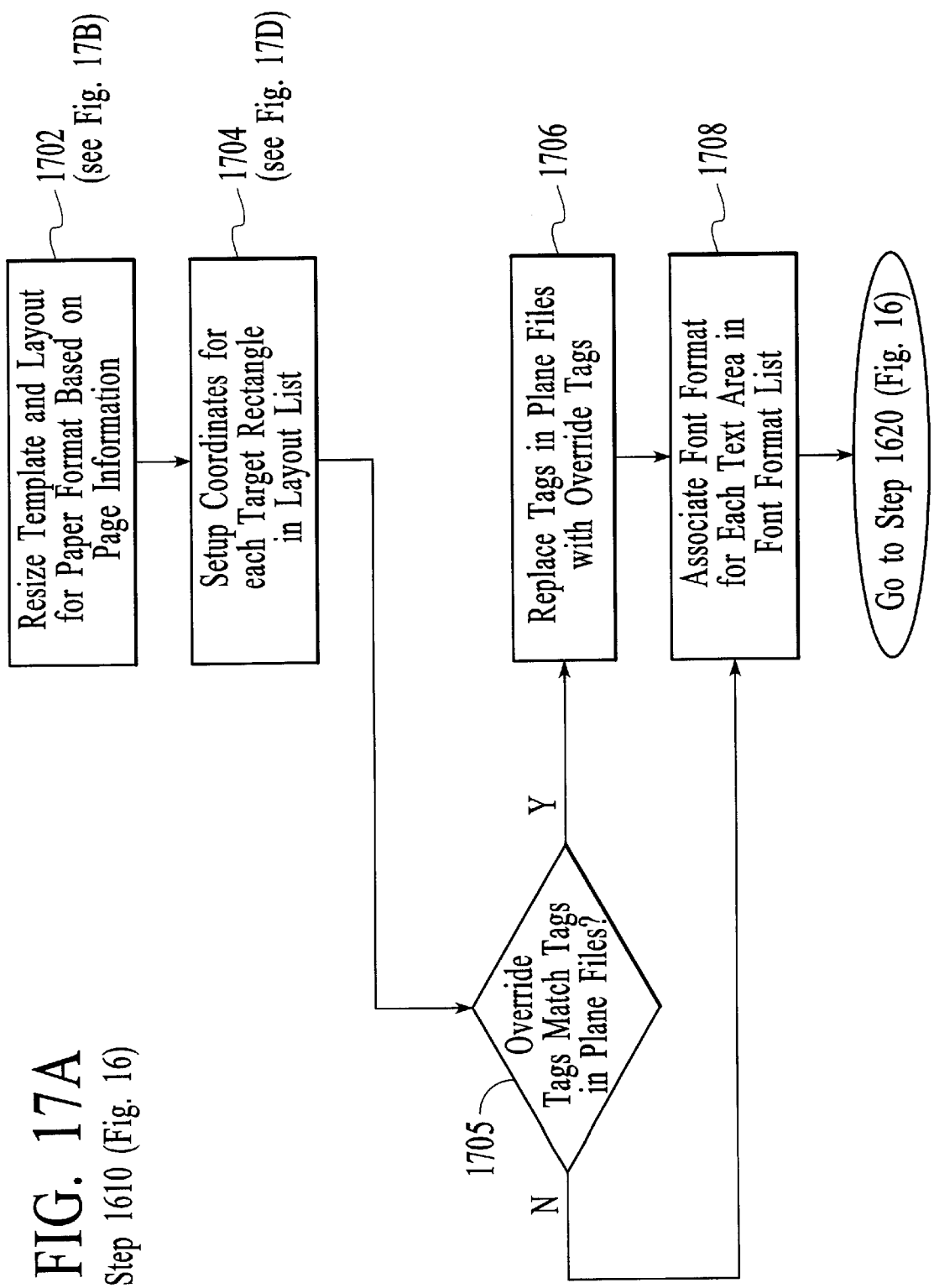

Step 1702 (Fig. 17A)

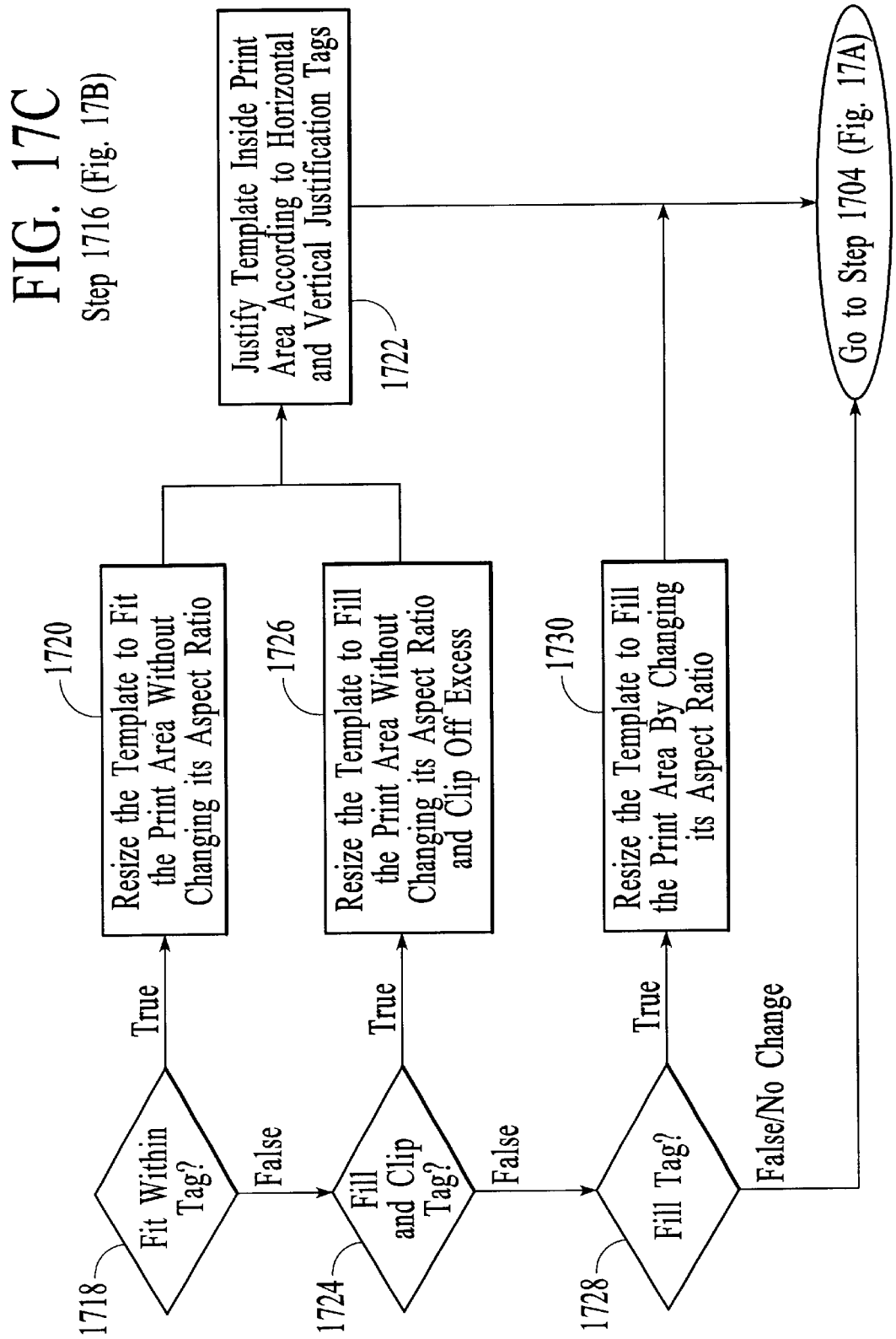

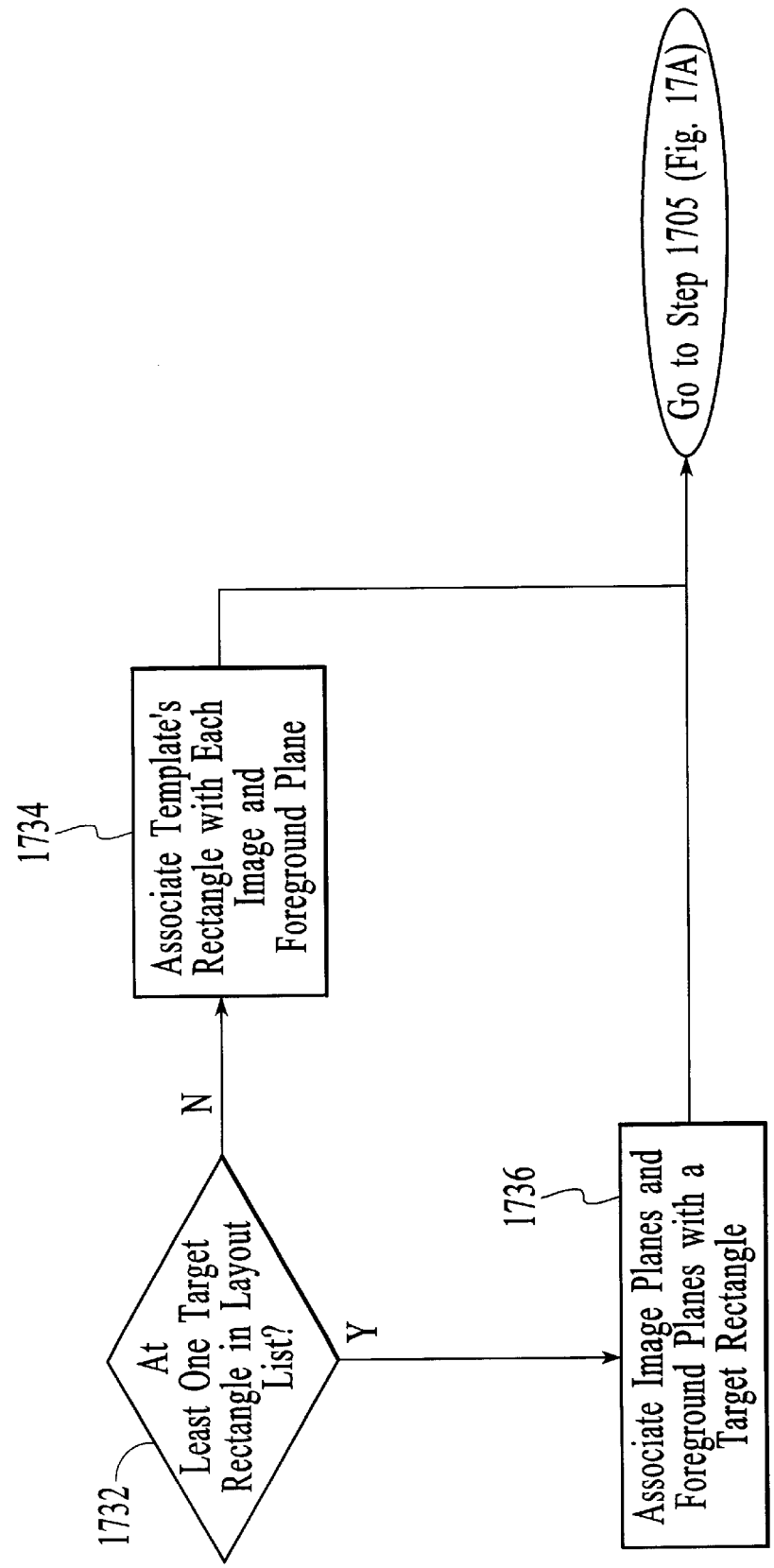

Step 1620 (Fig. 16)

Step 1804 (Fig. 18A)

Step 1806 (Fig. 18A)

Step 1630 (Fig. 16)

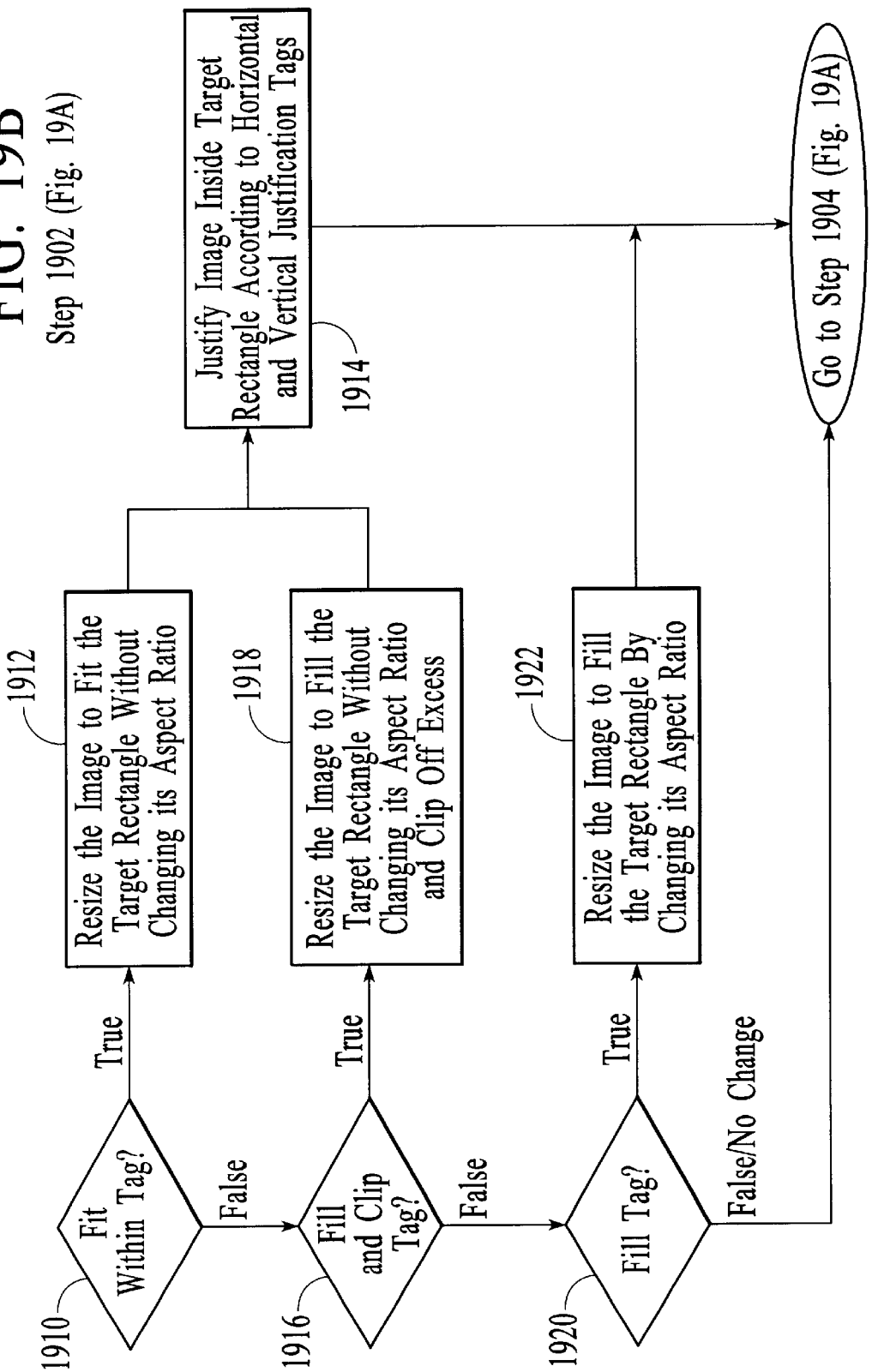

Step 1640 (Fig. 16)

CREATION AND USE OF COMPLEX IMAGE TEMPLATES

FIELD OF THE INVENTION

The present invention relates to imaging with a digital camera, and more particularly to the application of templates to images.

BACKGROUND OF THE INVENTION

The application of templates is a common and popular manner of manipulating digital images. A template refers to graphics added to a digital image to give some kind of effect. An example of a template is the addition of borders to give the effect that the image is inside a picture frame. Another example is the addition of text, such as "Happy Birthday," placed with the image.

FIG. 1 illustrates a conventional system for applying templates to digital images. The system 100 includes a digital camera 110 which captures digital images 120 and stores them. The camera 110 can be interfaced with a computer 130 through a serial port or some other type of connection mechanism 140. The computer has image processing software and page layout software for the manipulation of the digital images. Templates 150 are stored in the computer 130. The user, using the software, manually applies a template to a digital image, including any manipulation of the template and/or the image so that they fit together properly in a print area, or an area in which the resulting image will reside. Such manipulations include cropping, rotating, stretching, and justifying. The resulting image can be displayed via a printer 160.

One problem with the conventional system 100 is the requirement for extensive user interface. The application of the template must be manually performed by the user. This is cumbersome for the user, and with numerous images, would require a tremendous amount of time and effort. Another problem is that the templates store the actual graphics data that is applied to the image. Even if two or more templates have a common graphical component, such as a frame around the image, that component must be replicated and incorporated into each template. Graphic intensive templates, or large numbers of templates, thus require large amounts of storage space and significant processing time. This storage space and processing time requirement is cumbersome and costly.

Other conventional systems include the application of templates in a printer rather than a computer, or in a camera for direct print to a printer. However, for all of these conventional systems, templates may only merge graphics with the image and do not merge graphics which lay on top or behind the image. Thus, complex graphical effects are not possible.

Thus, there exists a need for a method and system for applying templates to digital images which reduces the required amount of user time for the interface, requires less storage space, and is capable of applying complex graphical effects to the image. The present invention addresses such a need.

SUMMARY OF THE INVENTION

The present invention provides a method and system for the creation and use of simple and complex templates. The system includes providing the template where the template contains a plurality of tags, and then applying the template to the image based on the tags. The plurality of tags provide instructions for the application of a plurality of plane files to be applied to the image. The method and system in accordance with the present invention automates the process of applying templates to images which reduces the required amount of user time for the interface. Its use of tags to store the template requires less storage space. The method and system in accordance with the present invention thus saves the user considerable time and effort in applying templates. It also require less processing time over manual template creation methods.

BRIEF DESCRIPTION OF THE FIGURES

FIGS. 15A–15F are block diagrams illustrating graphically the steps performed by the user in choosing templates and images in the system in accordance with the present invention.

FIGS. 17A–17D are flow charts illustrating the reading of tags in a template file in accordance with the preferred embodiment of the present invention.

FIGS. 19A–19B are flow charts illustrating the details of the rendering of an image plane in the preferred embodiment of the present invention.

DETAILED DESCRIPTION

The present invention provides an improved method and system for creating and applying templates to a digital image. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 20 in conjunction with the discussion below.

Figure 1:
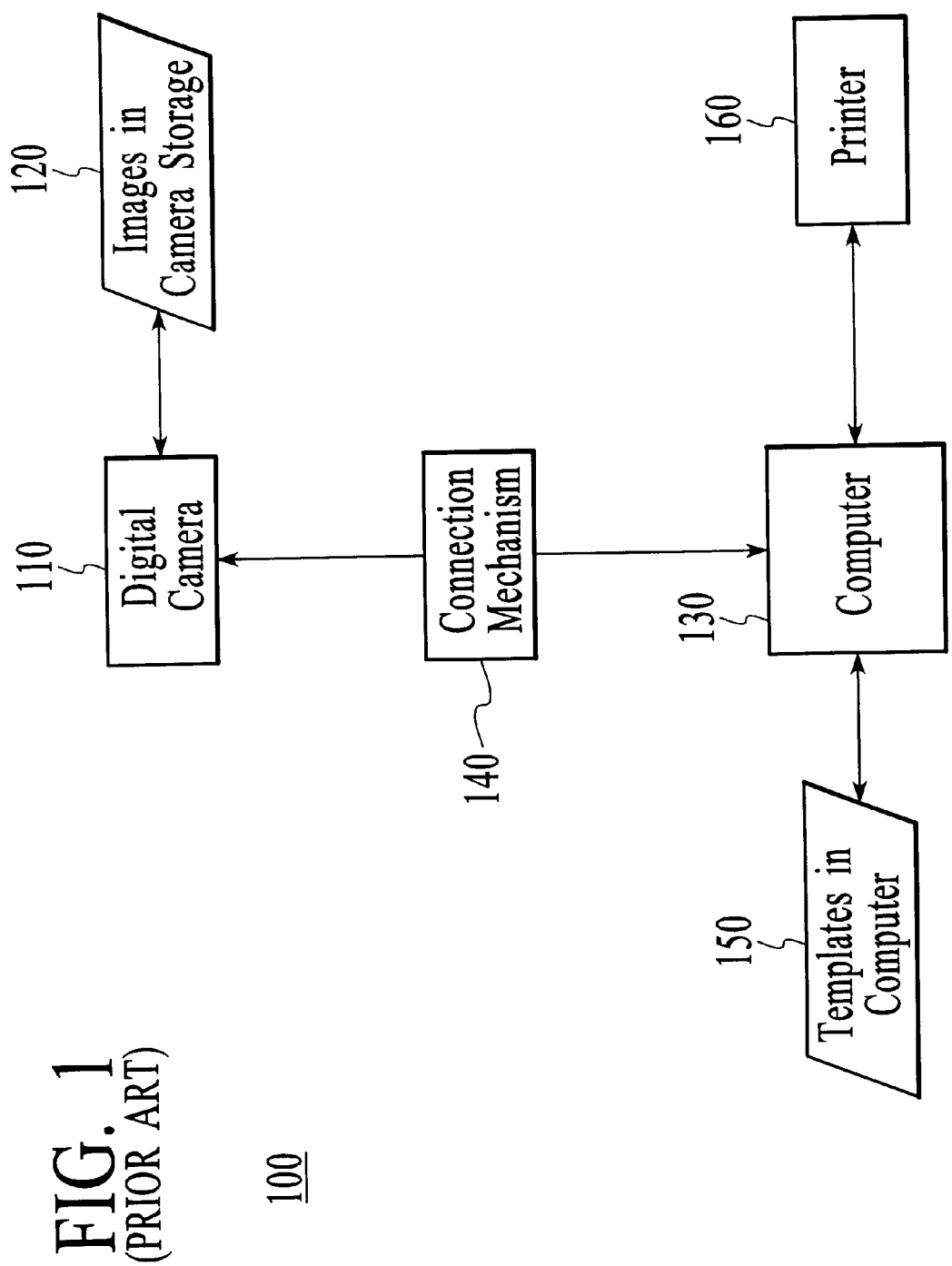
FIG. 1 is a block diagram of a system for applying templates to an image in a conventional method.
Figure 2:
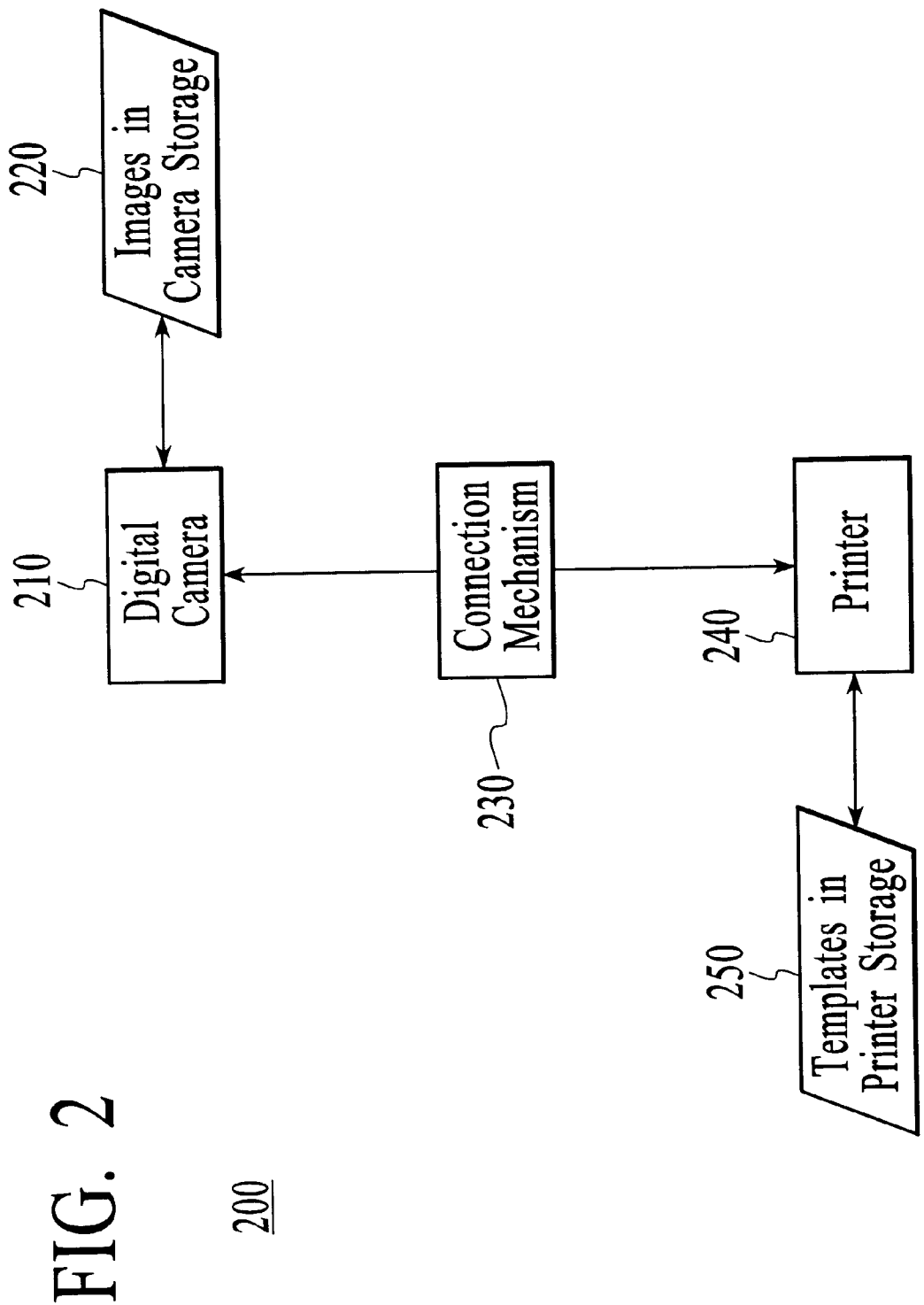
FIG. 2 is a block diagram of a system which may be used for applying templates to an image using a method and system in accordance with the present invention.

FIG. 2 illustrates an example of such a system 200. The system 200 includes a digital camera 210 which captures and stores digital images 220. The camera 210 transfers images to a printer 240 via a removable memory card or through a serial port, a universal serial bus, an infrared port, or some other type of connection mechanism 230. The printer 240 may also represent other types of output devices, such as a kiosk, for example. The digital camera 210 and the printer 240 contain compatible software for the automatic application of a template to a digital image. In a preferred embodiment, both printer 240 and camera 210 are controlled by a compatible operating system, such as the Digita OS from Flashpoint Technology, San Jose, Calif. Templates 250 are thus stored in the printer 240. Through an input device on or attached to the printer 240, such as buttons or keys, the user chooses which template is to be applied to which image.

For purposes of describing the features of the present invention, the system illustrated in FIG. 2 will be used. However, one of ordinary skill in the art will understand that other systems may be used without departing from the spirit and scope of the present invention, including a digital camera equipped with complex template software for use with a standard printer or a standard camera for use with a printer equipped with complex template software.

In the present invention, an object model approach is utilized to improve the creating and applying of a template to images over conventional techniques. By utilizing this approach, the required amount of time for the user interface is reduced because the templates are automatically applied to the images. Also, through the use of this approach, the storage space required for the templates is less with the object model approach.

Figure 3:
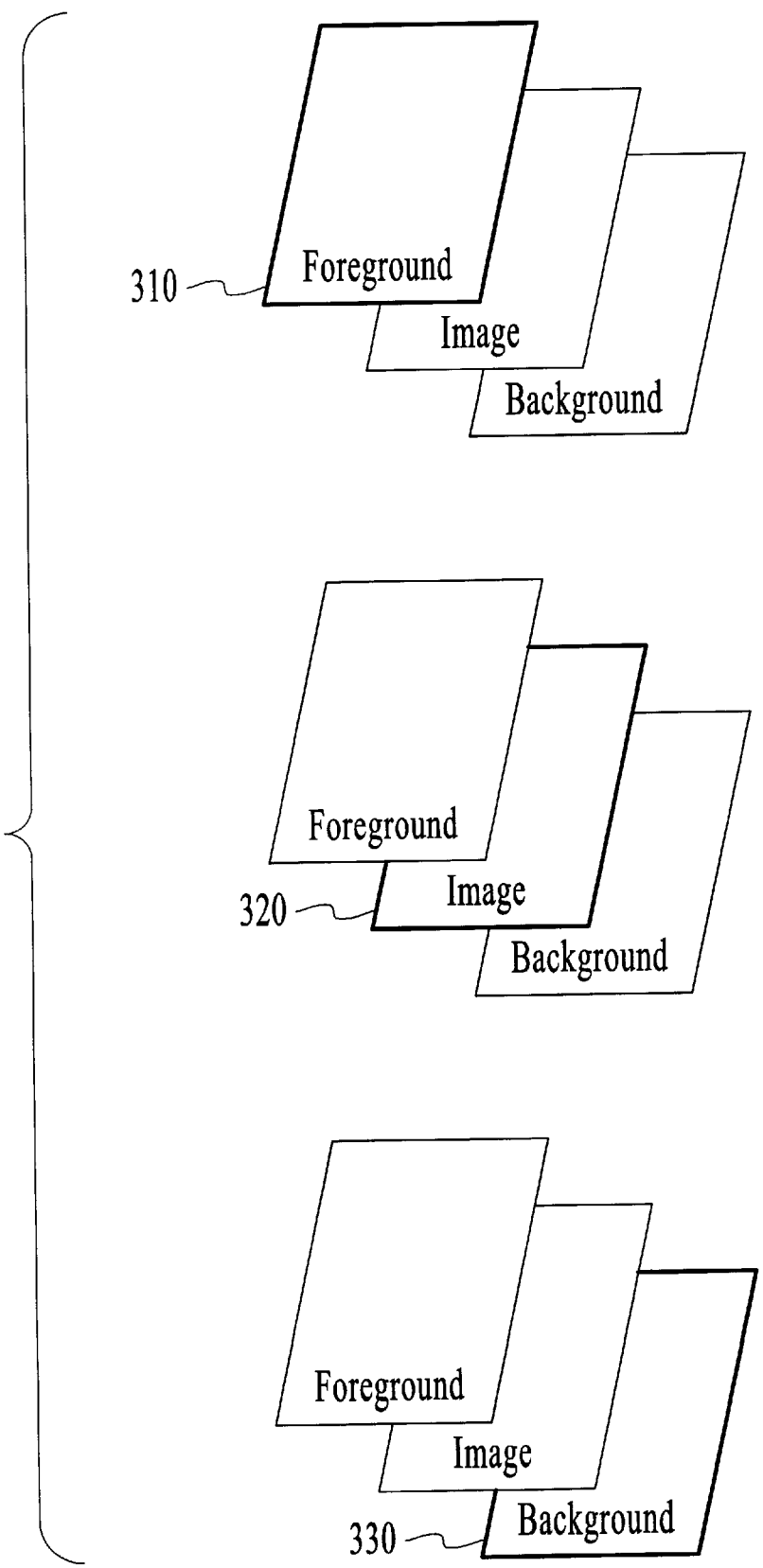
FIG. 3 is a block diagram of planes for an image in accordance with the present invention.

In a preferred embodiment of the present invention, a template is represented by two types of files or objects, a plane file and a template file. Planes are pre-defined effects (graphics and text) which can be applied to an image in a specified order. The plane file stores instructions for the application of graphics for a plane. In the preferred embodiment, there are three types of planes, as illustrated by FIG. 3: a foreground plane 310, an image plane 320, and a background plane 330. Graphics in the background plane 330 would lay behind the image. Graphics in the image plane 320 would be on the same plane as the image. Graphics in the foreground plane 310 would lay on top of the image.

The template file stores instructions for the application of the planes to the image. The instructions stored in the plane and template files are called "tags." Tags are instructions to the operating system on how and when to perform a task, such as to obtain a graphics file and apply its data to an image. Tags may also be "hints" or instructions which automate the process of how and when to change or edit the image or template in order to fit them together properly within a print area.

Figure 4:
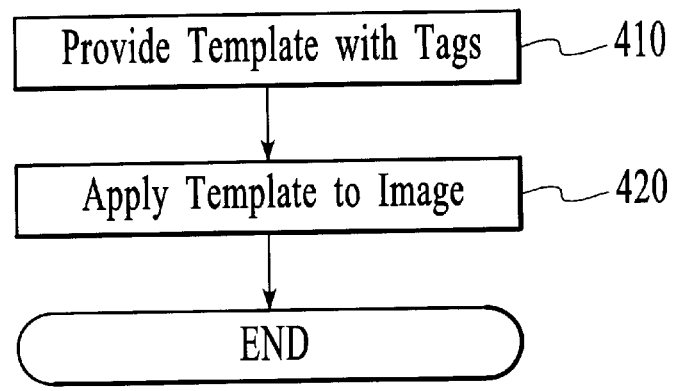
FIG. 4 is a flow chart illustrating the method and system for applying a template to an image in accordance with the present invention.

FIG. 4 is a simple flow chart illustrating the method and system of applying a template to an image in accordance with the present invention. First, a template with tags is provided, via step 410. Then, the template is applied to the image captured by an image capturing device, via step 420. In the preferred embodiment, the provided templates are pre-designed for the user. The user then chooses a particular template to be applied to a chosen image.

To more particularly describe the features of the templates in accordance with the present invention, please refer to FIGS. 5 through 13 and the discussion below.

Figure 5B:
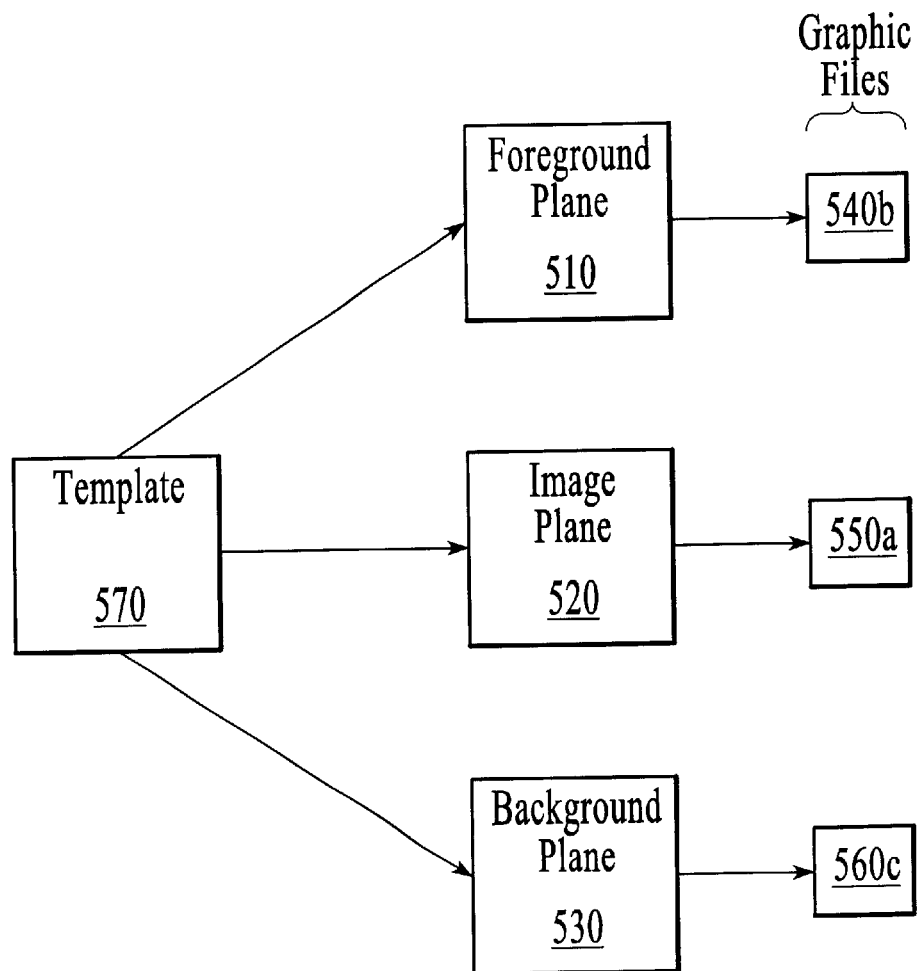
FIGS. 5A–5B are block diagrams illustrating a preferred embodiment of template files in accordance with the present invention.
Figure 5A:
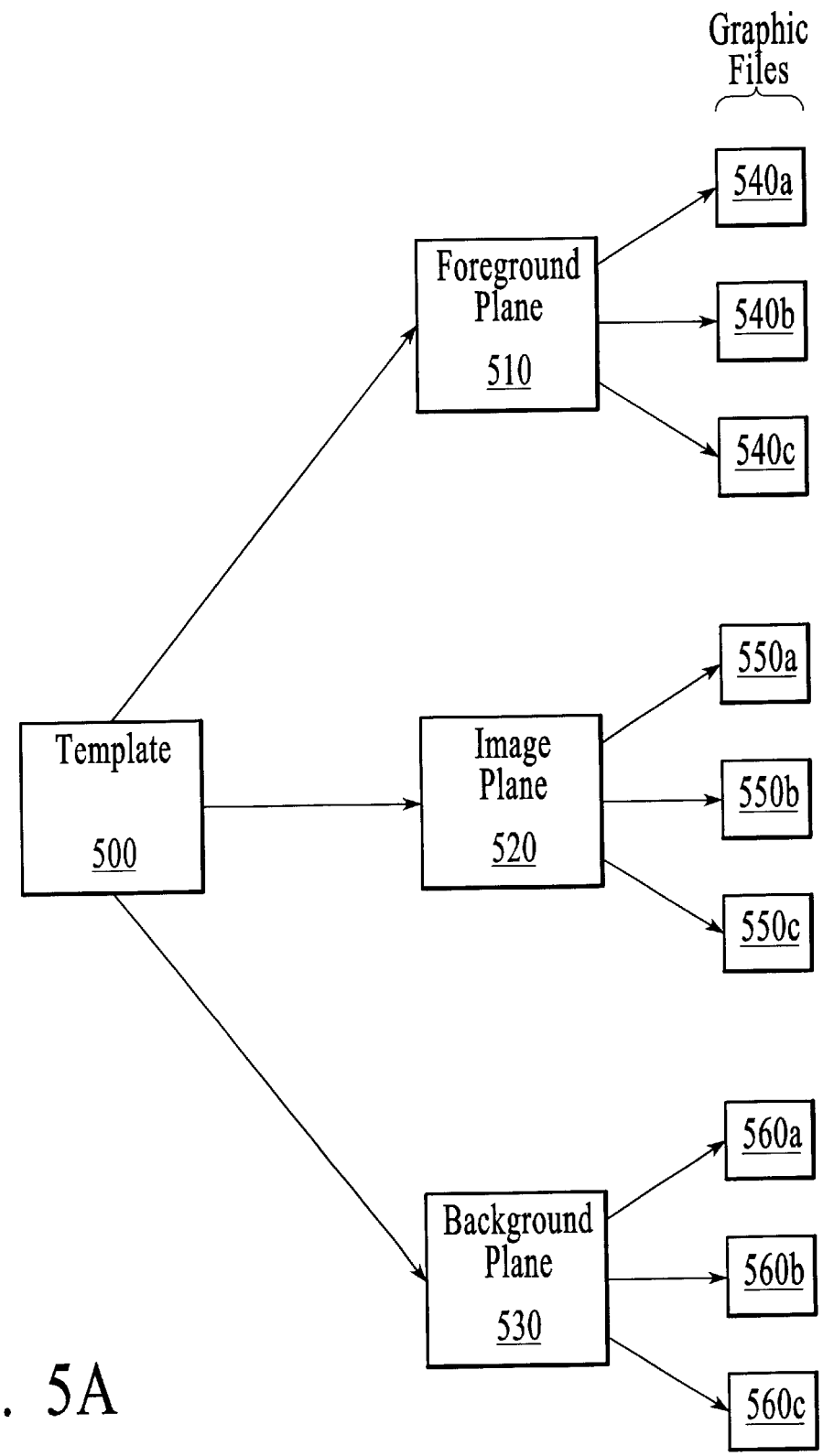

FIG. 5A is a block diagram of a preferred embodiment of a template file in accordance with the present invention. A template file 500 contains tags which are organized into groups, corresponding to the foreground plane 510 for instructions in applying plane files 540a–540c, the image plane 520 for instructions in applying plane files 550a–550c, and the background plane 530 for instructions in applying plane files 560a–560c. Although three graphics files for each plane is shown here, there may be any number of graphics files per plane.

Although a template in accordance with the present invention is disclosed with three planes, one of ordinary skill in the art will understand that any number of planes may be used without departing from the spirit and scope of the present invention.

Figure 6:
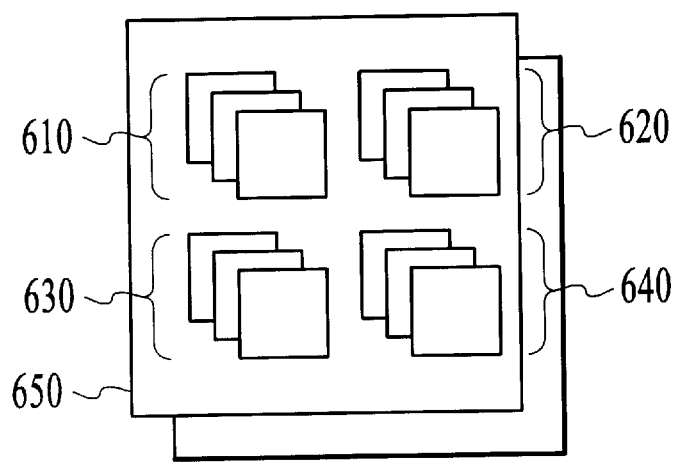
FIG. 6 is a block diagram of multiple images in a print area in accordance with the present invention.

Templates may also be used when more than one image is displayed in a print area, as illustrated in FIG. 6. The print area 650 in FIG. 6 contains four images (610–640). Each image contains the three planes as described with FIG. 3. A separate template may be applied to each image with the images associated with each other through information stored on the template.

Figure 7:
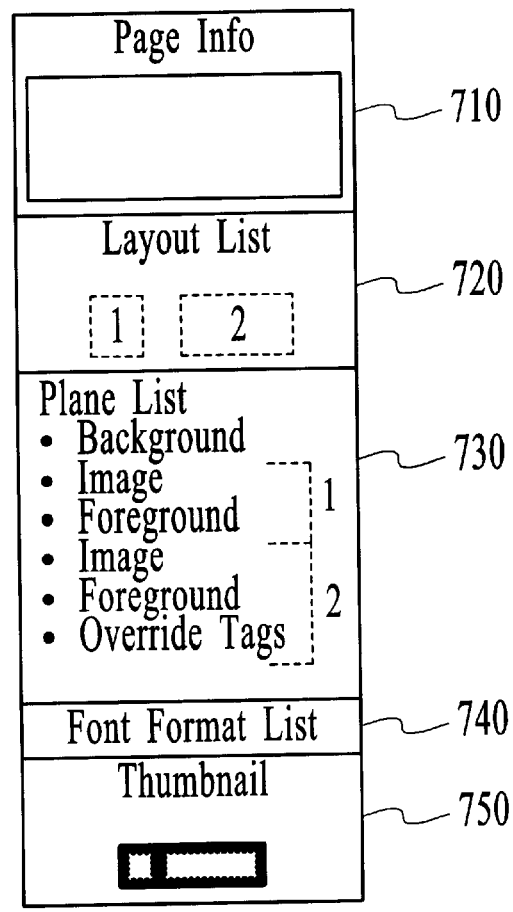
FIG. 7 is a diagram of a preferred embodiment of the structure of a template file in accordance with the present invention.
Figure 8:
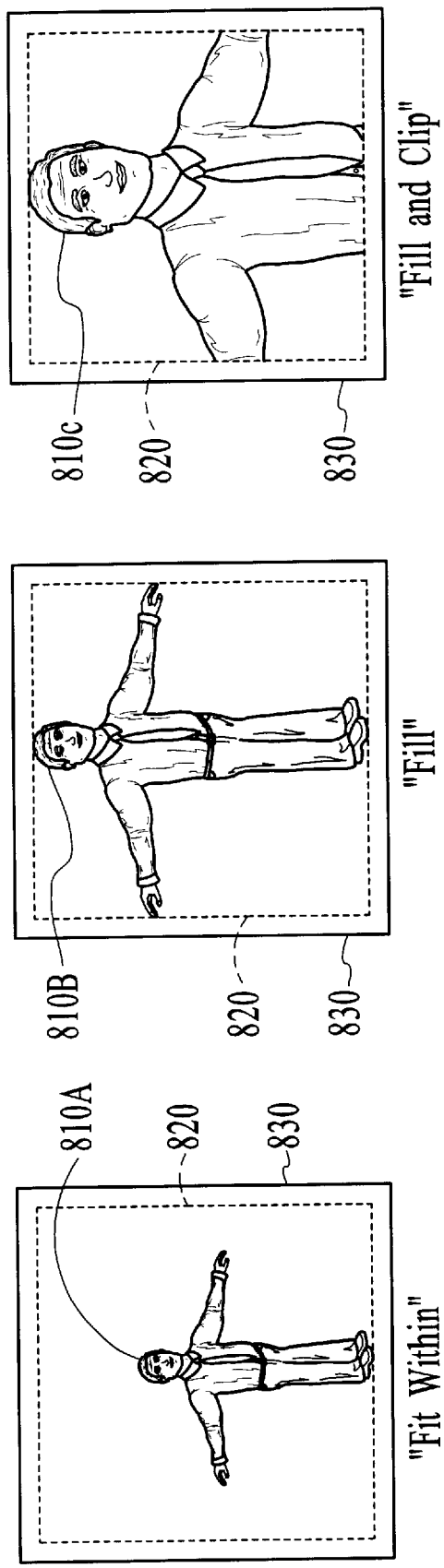
FIGS. 8A–8C are diagrams illustrating sizing option tag examples in accordance with the present invention.

FIG. 7 illustrates in detail the preferred embodiment of the structure of a template file in accordance with the present invention. Tags stored in a template file 700 include the Page Information 710, a Layout List 720, a Plane List 730, a Font Format List 740, and a Thumbnail 750.

The Page Information 710 includes tags for the shape of the print area, tags for the preferred page format (such as letter, legal, A4, etc.), tags for vertical and horizontal justification (left, right, center), tags for sizing options (including hints for fitting this template onto a page with a different aspect ratio), and margins.

FIGS. 8A–8C illustrate three examples of sizing options tags in the preferred embodiment, "Fit Within," "Fill," and "Fill and Clip." As demonstrated in FIG. 8A, the Fit Within tag instructs the operating system on how to fit an image 810A within a print area 820 in a plane 830 without changing its aspect ratio. An aspect ratio is the ratio of the width of the image to the height of the image. The image 810A is enlarged until it completely fills either the height or the width of the print area 820. FIG. 8B illustrates the Fill tag which instructs the operating system on how to fill the entire print area 820 with the image 810B by changing its aspect ratio. The proportions of the image 810 is changed until both the height and the width of the print area 820 are filled. FIG. 8C illustrates the Fill and Clip tag which instructs the operating system on how to fill the print area 820 with the image 810C without changing its aspect ratio. As illustrated in FIG. 8C, the image 810C is enlarged without changing its aspect ratio until it fills both the height and the width of the print area 820. Whatever portions of the image 810B which do not fit in the print area 820 is then clipped away. Sizing option tags of this type may also be used to size the template and graphics in the background, image, and foreground planes.

The Layout List 720 (FIG. 7) of the template file 700 contains tags for target rectangles, into which images will be placed, with their positions and dimensions described. If multiple images are on a layout area, such as that illustrated in FIG. 7, the images are associated with each other through the Layout List 720.

Figure 9:
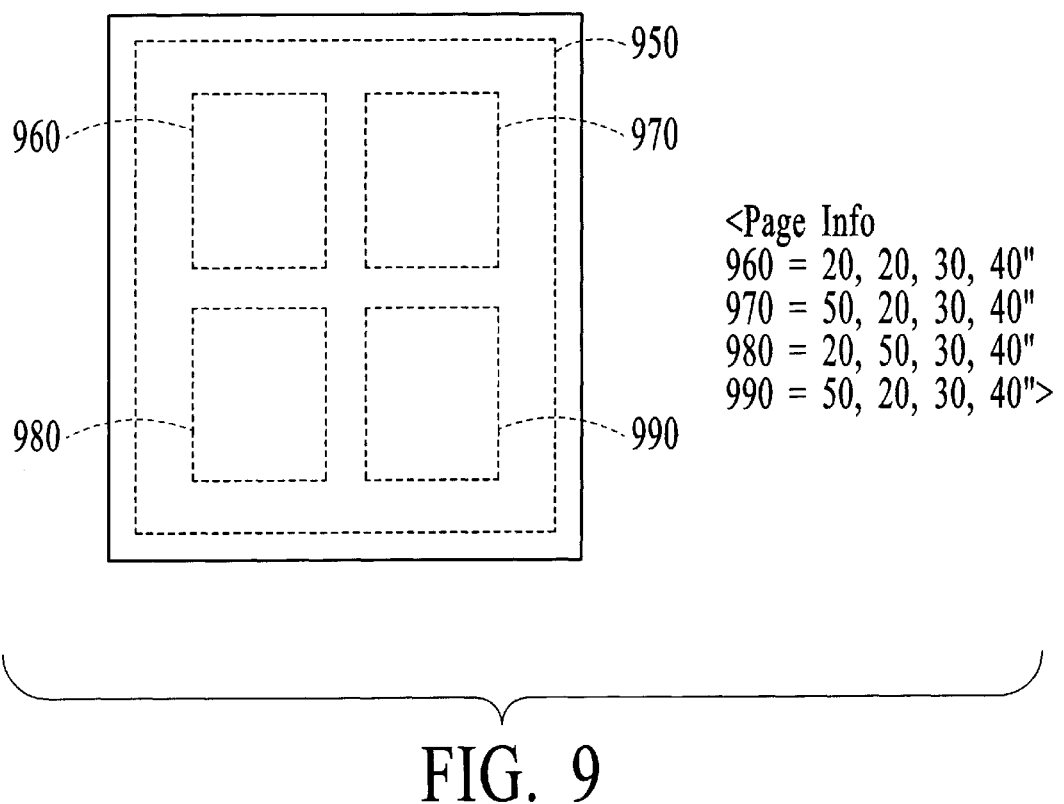
FIG. 9 is a diagram illustrating position and dimension information for target rectangles in the Page Information in accordance with the present invention.

In the preferred embodiment, the positions and dimensions of each target rectangle are defined by the coordinates of the rectangle's top-left and bottom right corners, as illustrated in FIG. 9. The print area 950 has four target rectangles, 960–990. The top-left corner of rectangle 960 has the coordinates (20, 20) while its bottom-right corner has the coordinates (30, 40). In the same manner, rectangle 970 has coordinates (50, 20, 30, 40), rectangle 980 has (20, 50, 30, 40), and rectangle 990 has (50, 20, 30, 40). These coordinates would be stored as tags in the Layout List.

The Plane List 730 contains tags for the application of plane files which contains tags for the graphics data for the plane. Override tags may be included in the Plane List 730 which replace equivalent tags in a plane file. Override tags apply to specific plane files. For each plane file specified in the Plane List 730, a set of overrides can be associated. Thus, multiple tags of the same type might exist in a template file, if multiple plane files are referenced. When the tags from a plane file are loaded in preparation for applying the plane to the current work area, all tags are compared to the associated set of override tags. If there are any tags that match, the override tag replaces the plane file tag. This feature allows a plane file to specify a "typical use" which can be overridden for a specific template by the template designer.

The Font Format List 740 contains tags for the font format for each text field that may be involved in the template, including the font name, font size, font style, font color, and line justification.

The template file 700 also contains a Thumbnail 750 which is a low resolution image of the template which can be rapidly displayed for the purpose of previewing or browsing through the templates.

Because the template files of the present invention store tags with the actual graphical data stored in a separate plane file, considerable storage space is saved. Under the method of the present invention, similar graphical components need not be replicated for each template. Instead, tags in more than one template file can instruct the operating system to apply the same plane file to different images. Referring again to FIG. 5A and also to FIG. 5B, example template 570 uses the same plane files 540*b*, 550*a*, and 560*c* in its foreground, image, and background planes respectively as template file 500. Under the conventional method, the graphical data in these plane files would need to be replicated, once for template 500 and once for template file 570. However, the method of the present invention requires only one copy of each plane file to be stored regardless of the number of templates which use these files. Thus, numerous template files may have tags which instruct the operating system to apply the same plane files to different images without the need to replicate the actual graphical data themselves. This saves considerable storage space. In addition, the method of the present invention allows graphics planes to be "built in" to a template, allowing for self-contained templates. If this case, the graphics are not accessible by other templates.

Figure 10:
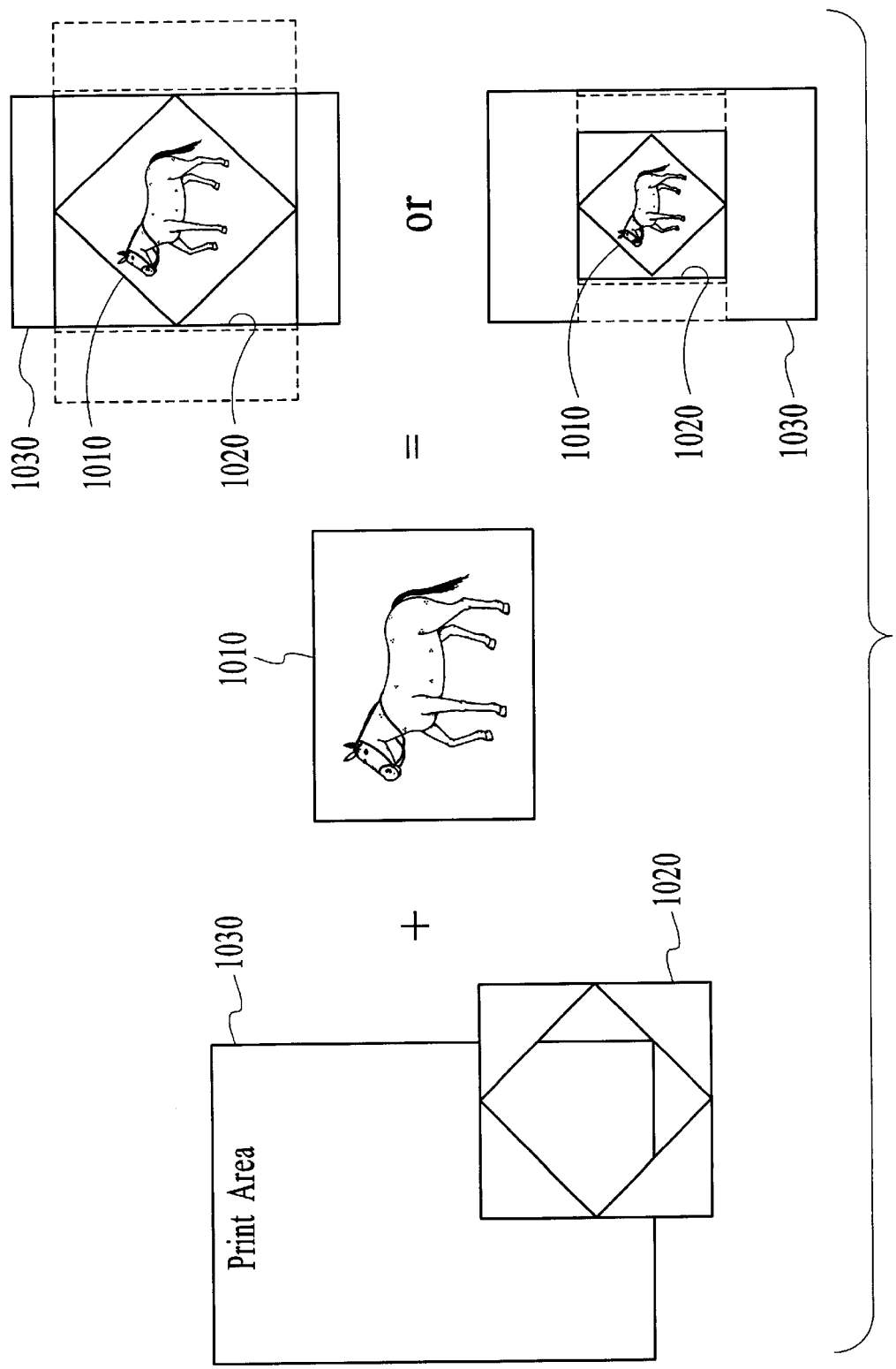
FIG. 10 is a diagram illustrating an example of the application of a simple template to an image in accordance with the present invention.

Templates of the present invention may be either simple or complex. FIG. 10 illustrates an example of the application of a simple template to an image in accordance with the present invention. In a simple template, only one graphic in the image plane is merged with an image. The user chooses the image 1010 to be merged with a simple template of a frame 1020 around the image. The graphics data for the frame 1020 would be stored in a plane file separate from the template file. The tags in the template file instructs the operating system to take the frame 1020 and apply it to the image 1010. The operating system uses the hints in the Page Information to change the image and/or the frame so that they fit properly together onto the print area 1030.

Figure 11:
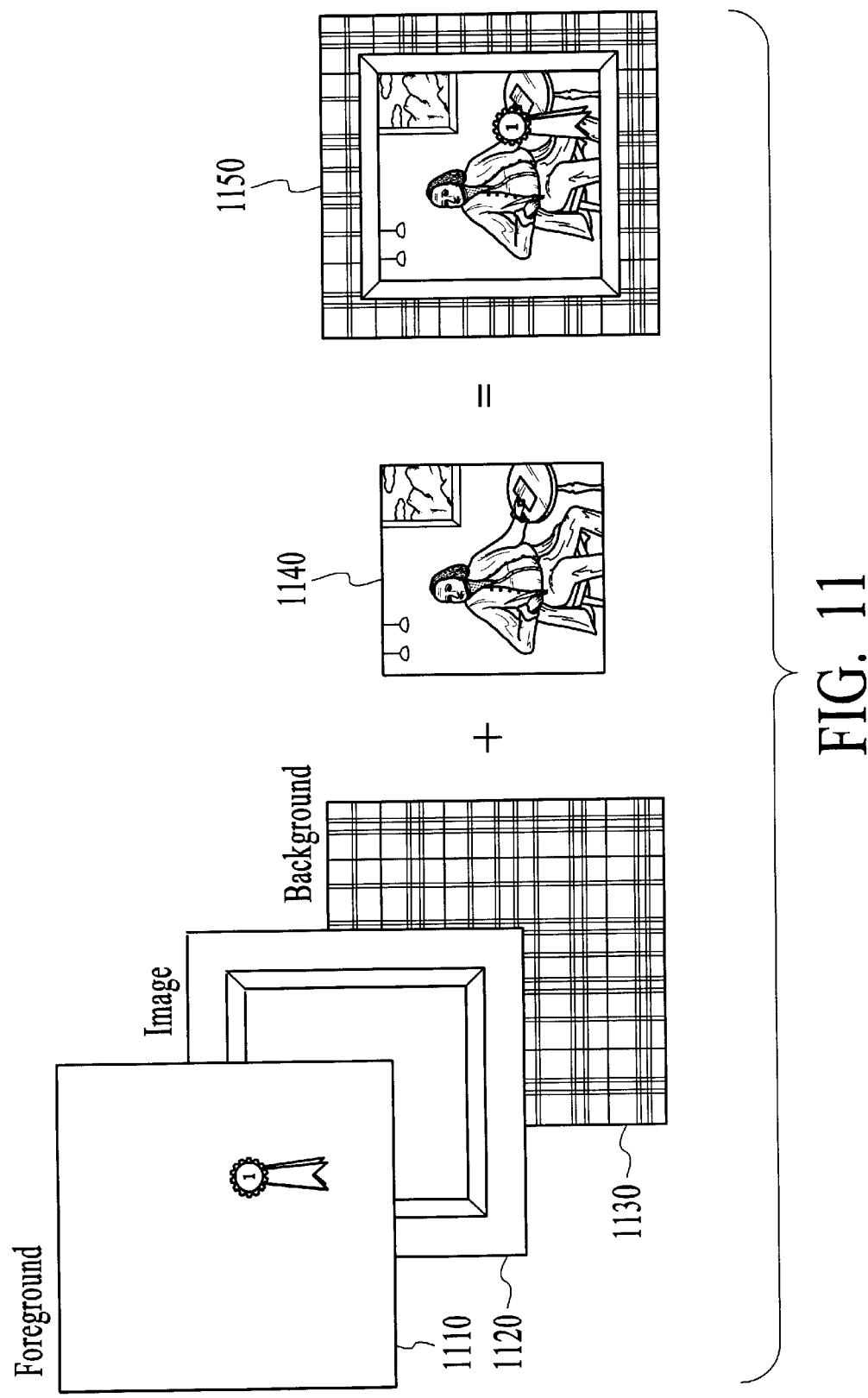
FIG. 11 is a diagram illustrating an example of the application of a complex template to an image in accordance with the present invention.

FIG. 11 illustrates an example of the application of a complex template to an image in accordance with the present invention. In a complex template, more than one plane file is applied to an image in one or more of the planes. In this particular example, there is only one plane file applied to each plane, however there could be any number of plane files. Through the tags in the template and plane files, the operating system applies a plaid pattern 1130 behind the image 1140 in the background plane, merges a frame 1120 with the image 1140 in the image plane, and applies a badge 1110 on top of the image 1140 in the foreground plane. These three planes are then merged to result in image 1150.

Figure 12:
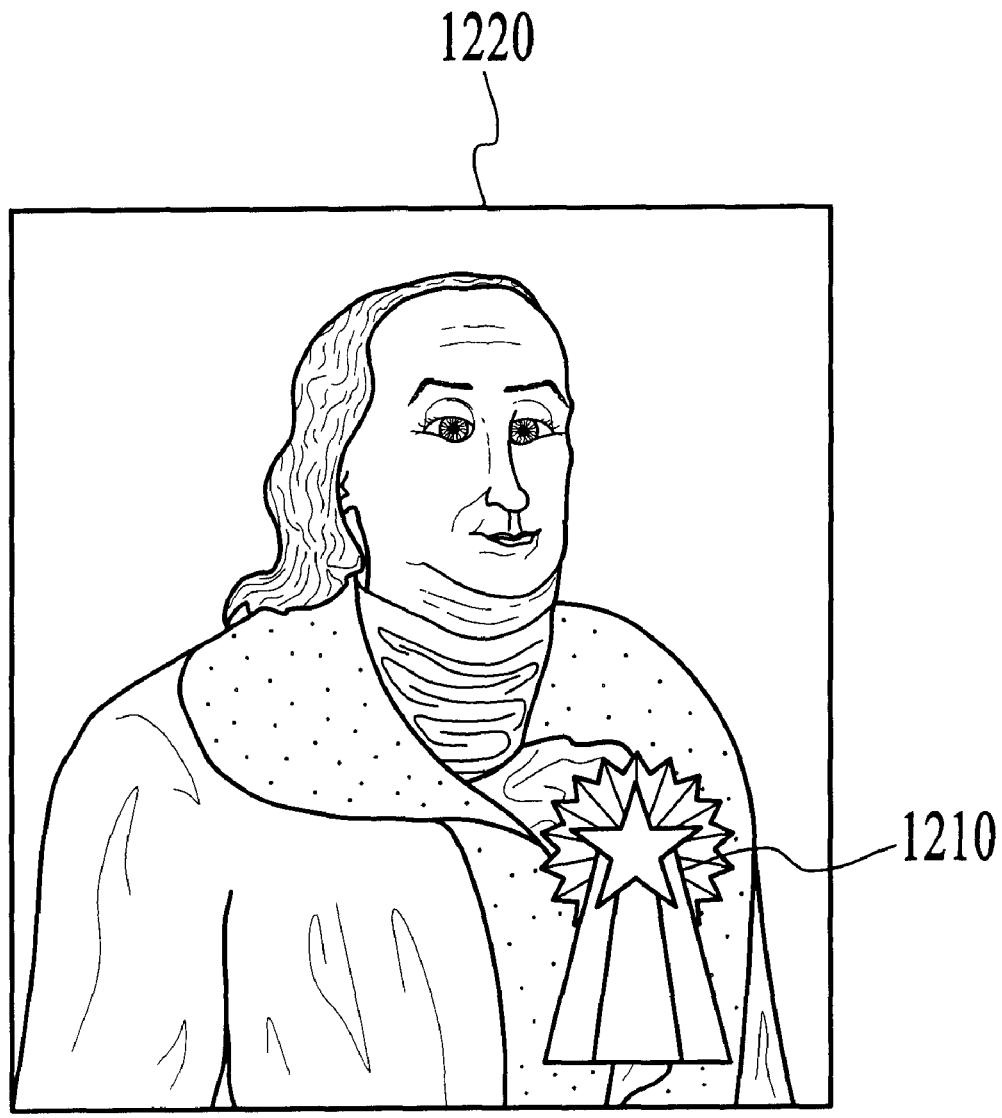
FIGS. 12–13 are diagrams illustrating the Extent tag and masking in accordance with the present invention.
Figure 13:
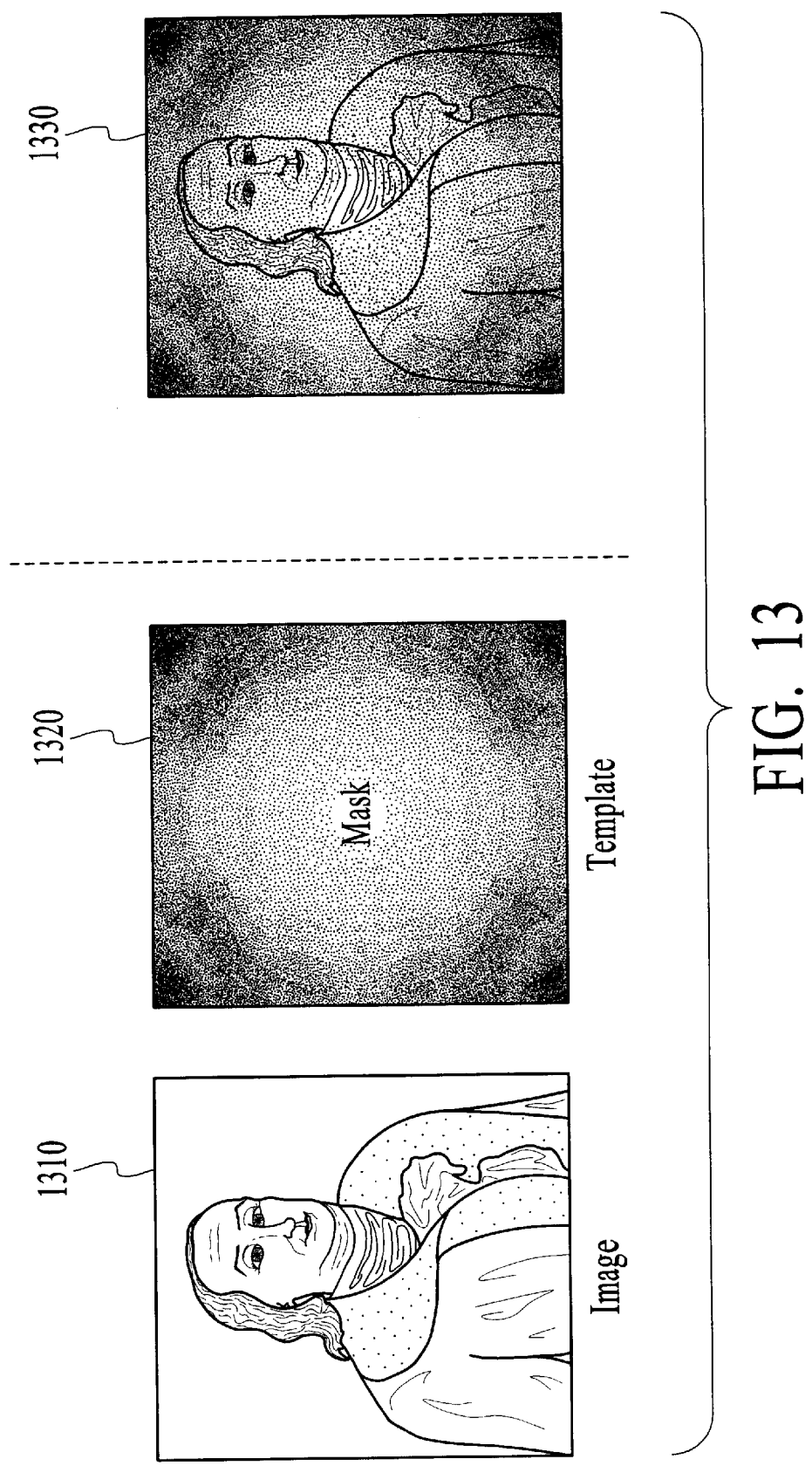

FIGS. 12 and 13 illustrate two more examples of graphics which may be applied with a complex template in accordance with the present invention: Extent tags and masking. FIG. 12 illustrates an Extent tag which resizes a graphic to a particular proportion with the image. Here, a badge 1210 is resized to 50% of the image 1720. FIG. 13 illustrates the application of a mask 1320 to an image 1310, resulting in an image 1330 with a graded, shaded appearance.

Still another example is the Fill Color tag (not shown) which may be used with the background plane. The Fill Color tag instructs the operating system to fill the background plane with a specified color. Texture may also be used for the background plane based on graphic data of the texture provided in the template file.

To more particularly describe the method and system for applying a template to an image in accordance with the present invention, please refer to FIGS. 14 through 20 and the discussion below.

Figure 14:
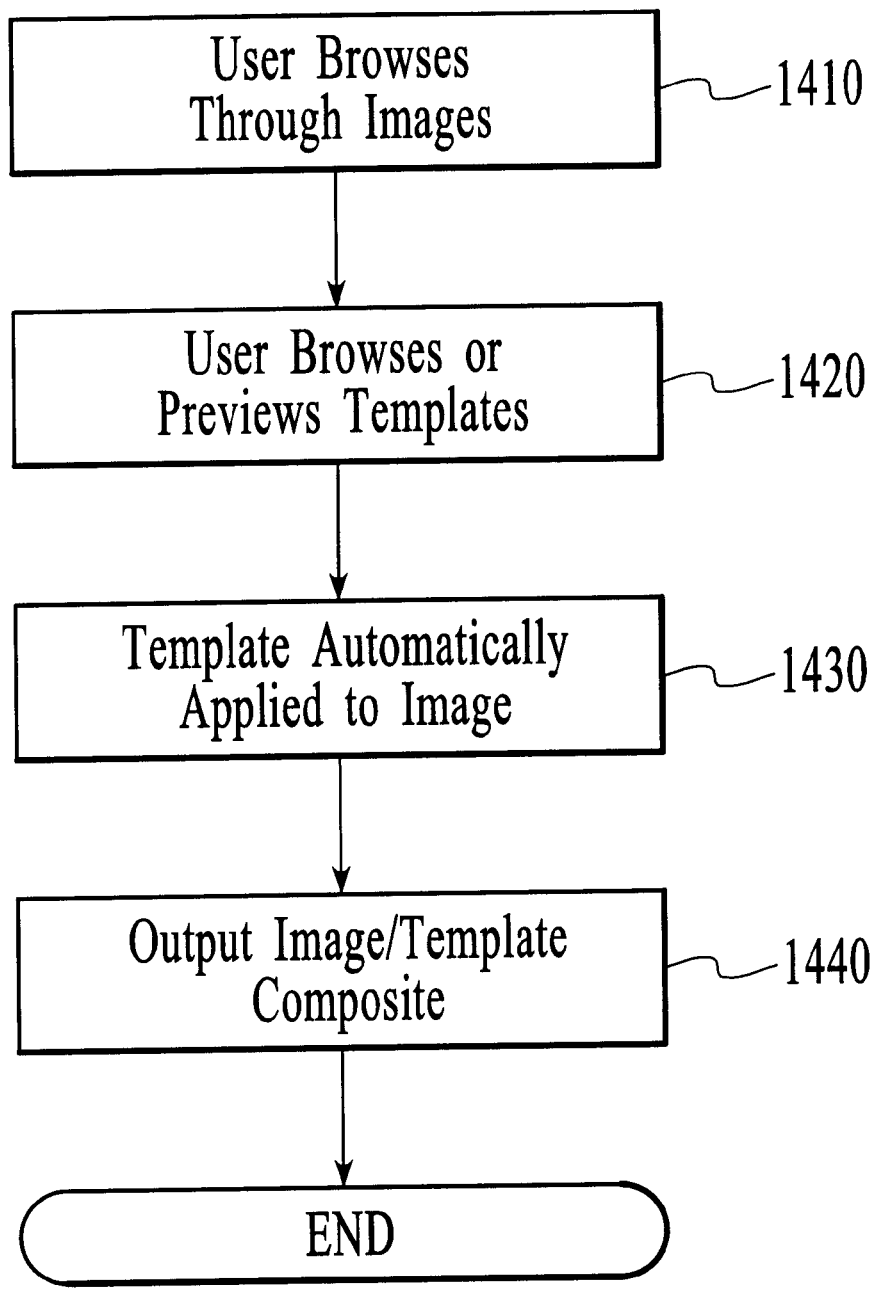
FIG. 14 is a flow chart illustrating the steps performed by the user in choosing templates and images in the system in accordance with the present invention.
Figure 15A:
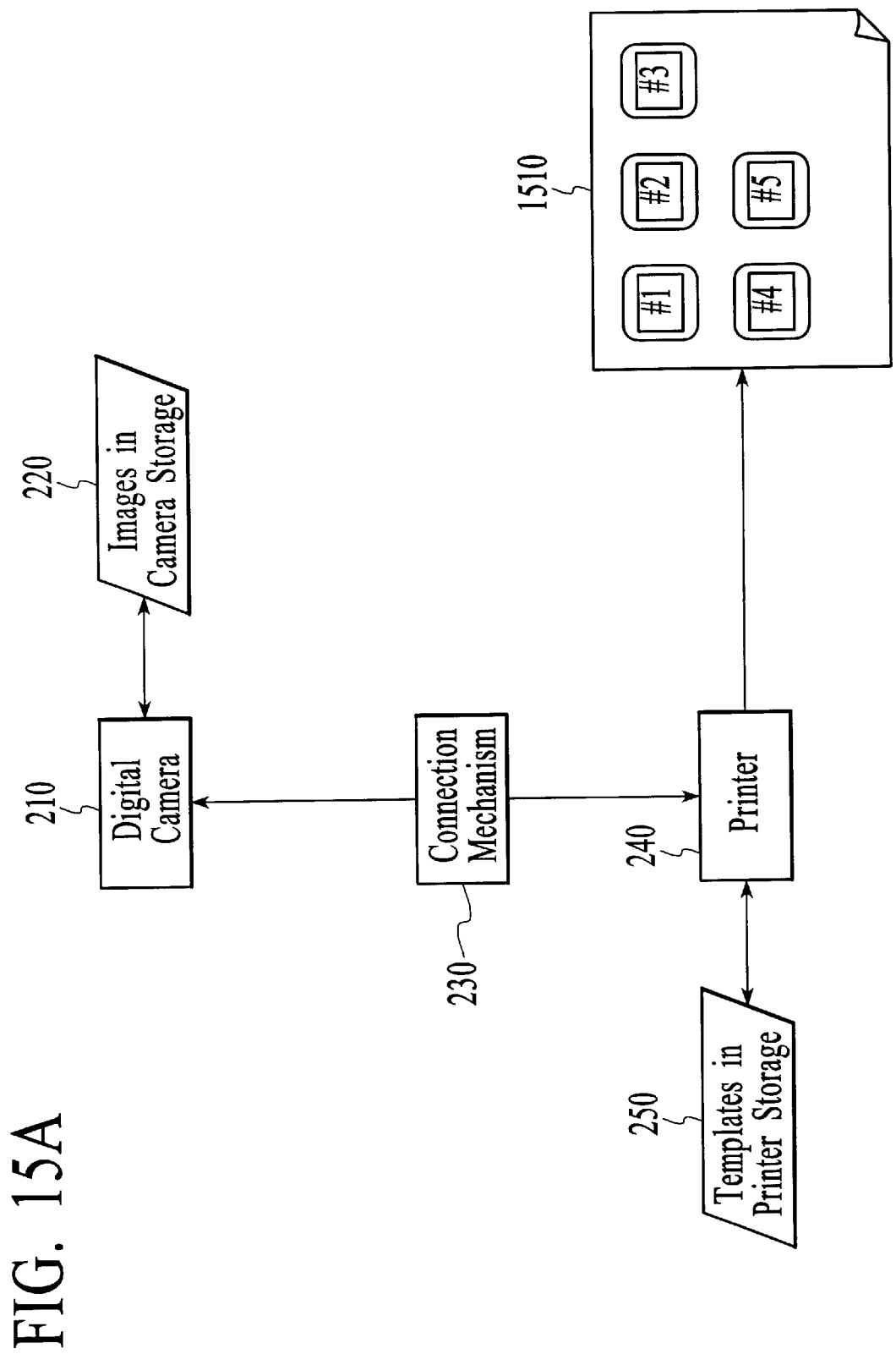
Figure 15B:
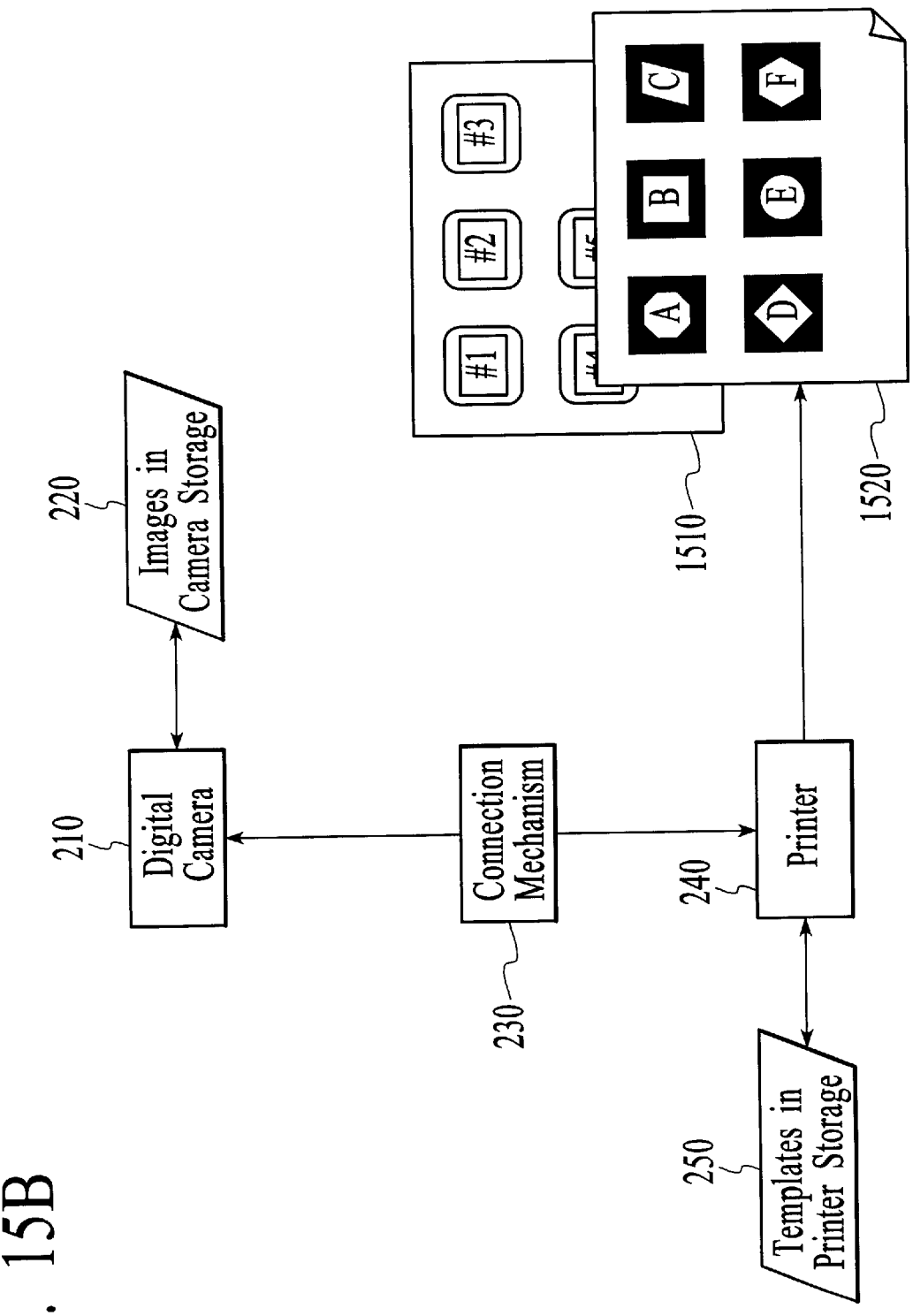
Figure 15D:
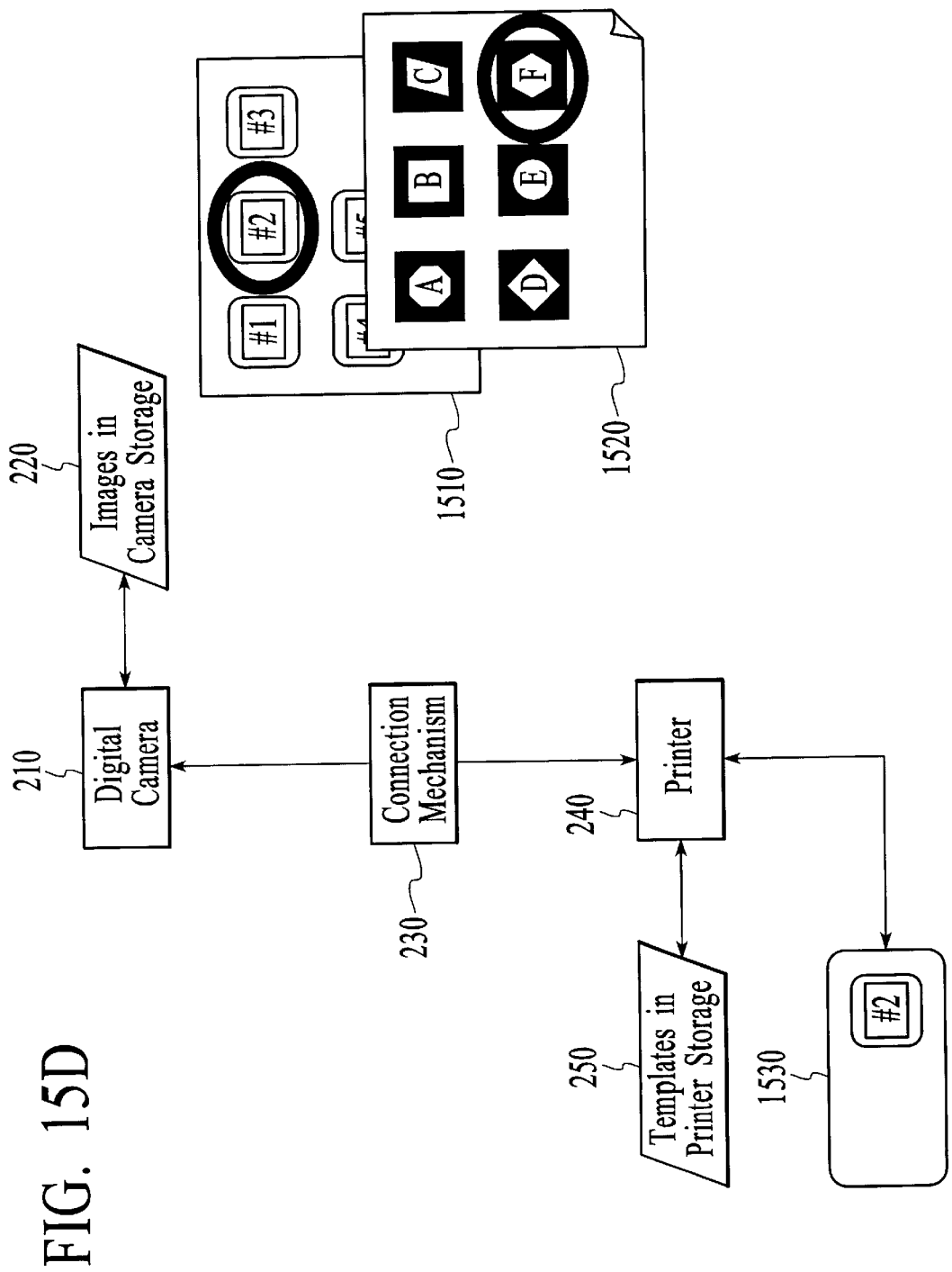
Figure 15E:
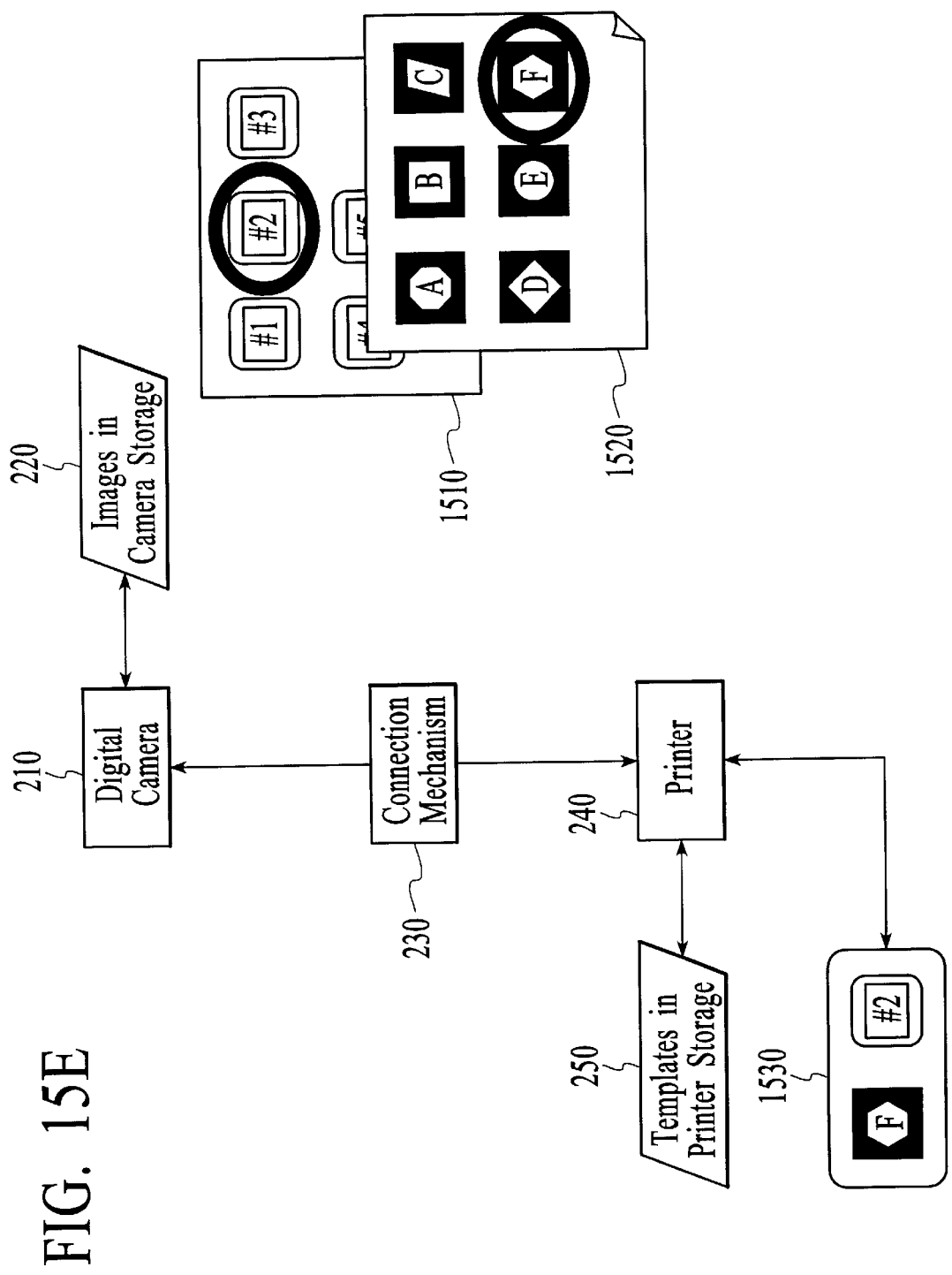
Figure 15F:
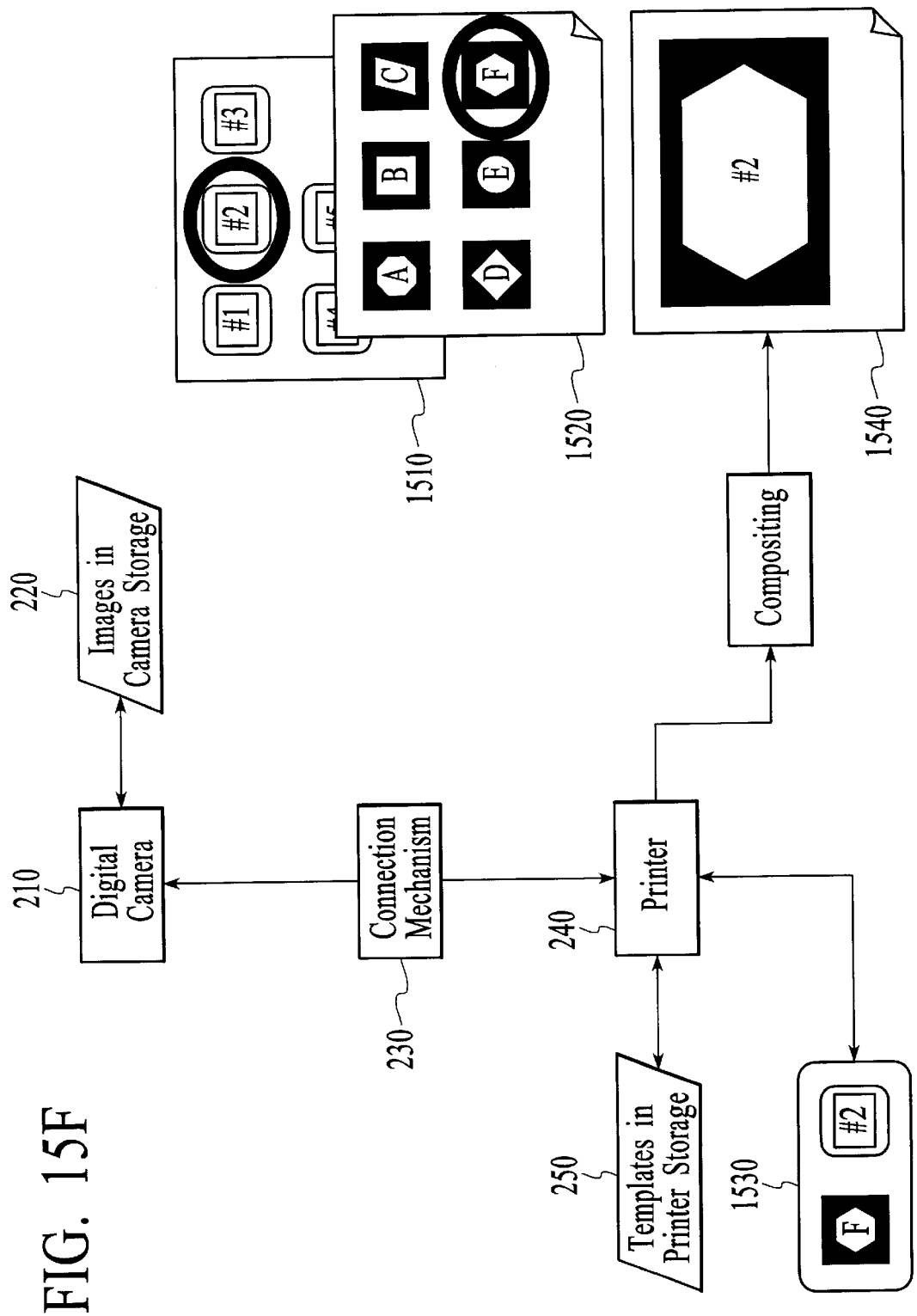

FIG. 14 is a flow chart of the steps a user performs in choosing templates and images to be merged in the system in accordance with the present invention. The user starts by browsing through the images, via step 1410. Next, the user browses or previews the available templates, via step 1420. Then, the user chooses the template he or she wishes to apply to an image, via step 1430. The operating system then automatically applies the template to the image, via step 1440. The user may then print the image/template composite, via step 1450. Steps 1410 through 1430 may be reordered such that the user chooses the template first, then chooses an image.

FIGS. 15A–15F illustrates graphically the steps the user performs as illustrated in FIG. 14. First, the user browses through the images 1510 stored in the camera 210 by printing a catalog of the images 1510, via FIG. 15A. Next, the user browses or previews the templates by printing a catalog of the available templates 1520 stored in the printer 240, via FIG. 15B. The user chooses a template from the template catalog 1520 (for example, template F) to be applied to an image from the image catalog 1510 (for example, image #2), via FIG. 15C. Once the user makes his or her choices, the printer 240 downloads the chosen image #2 into its working memory 1530, via FIG. 15D. The printer 240 also downloads the chosen template F into its working memory 1530, via FIG. 15E. As the data for template F is downloaded, the operating system in the printer 240 automatically composites template F with image #2 and outputs portions of the composite graphic 1540 as they are composited according to the instructions encoded in the template's tags, via FIG. 15F.

Although the choosing of templates and images has been described with the printing of catalogs by the user, one of ordinary skill in the art will understand that other methods of viewing the catalogs may be used, such as displaying them on an LCD screen on or attached to the printer, without departing from the spirit and scope of the present invention.

Unlike the conventional system, the method and system in accordance with the present invention simplifies the process by automatically applying templates to images without the need for a user to do so manually. The method and system of the present invention thus reduces the required amount of user time for the interface, saving the user money, time, and effort.

Figure 16:
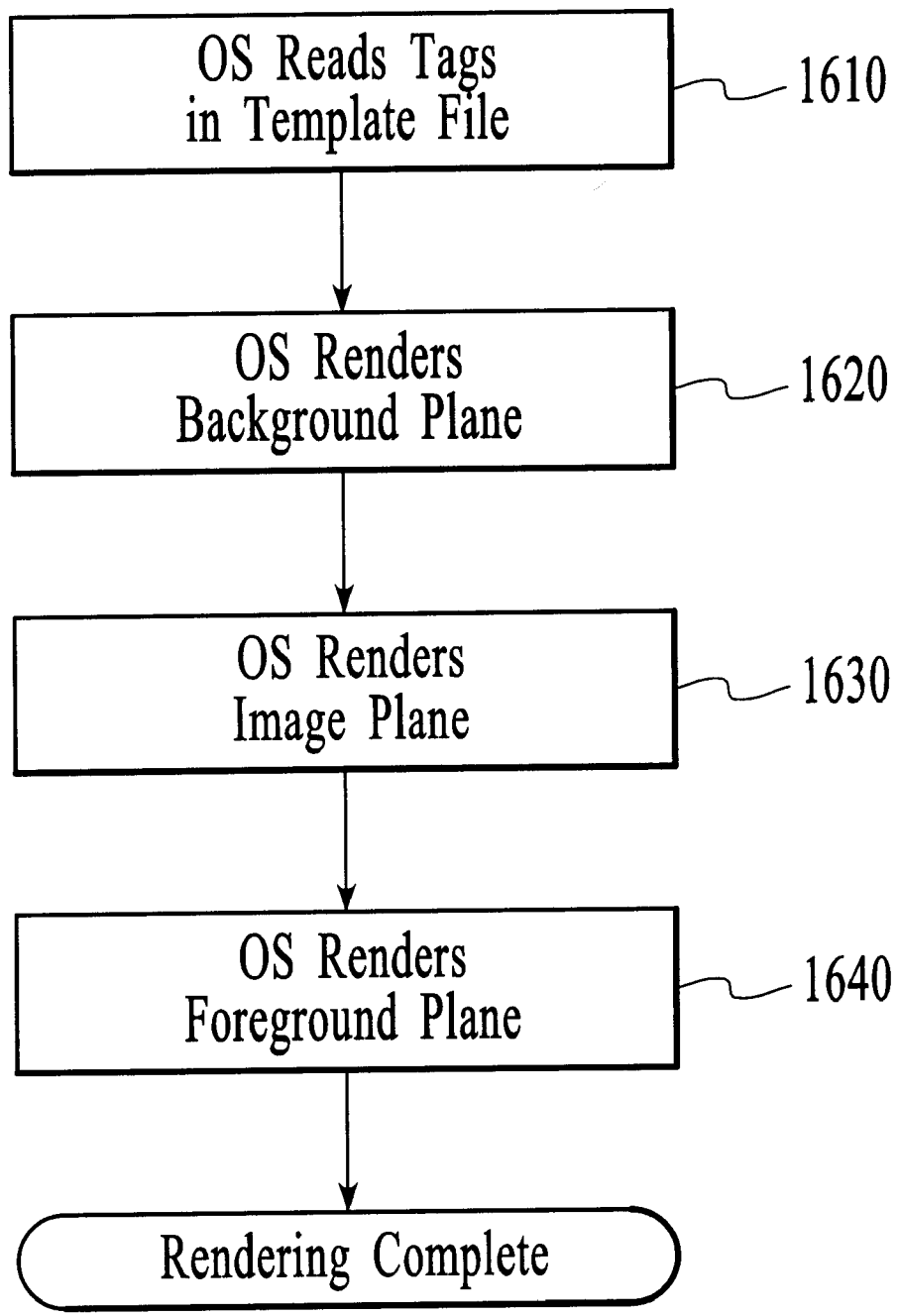
FIG. 16 is a flow chart illustrating a preferred embodiment of the compositing process of a template with an image in accordance with the present invention.

FIG. 16 is a flow chart illustrating a preferred embodiment of the compositing process of a template with an image in accordance with the present invention. In this preferred embodiment, the printer operating system first reads the tags in a chosen template file, via step 1610. Next, the operating system renders the background plane, via step 1620. Next it renders the image plane with the chosen image, via step 1630, and combines it with the rendered background plane. Then it renders the foreground plane, via step 1640, and combines it with the rendered background/image planes. The rendering process is then complete. This process may be done a whole page at a time, or one band of the page at a time, progressing down the page.

FIG. 17A is a flow chart illustrating the details of the operating system's reading of the tags in a template file (step 1610 of FIG. 16). First, the template and the layout is resized for the paper format that is described in the Page Information of the template file, via step 1702. Next, the coordinates for each target rectangle in the Layout List is set up, via step 1704. For each plane in the Plane List, the operating system then checks to see if there are any override tags which match the tags in the plane files, via step 1705. If so, then the override tags replace the tags in the plane files on the Plane List, via step 1706. Next, the font format is associated with each text area in the Font Format List, via step 1708. If there are no override tags, step 1706 is skipped.

Figure 17B:
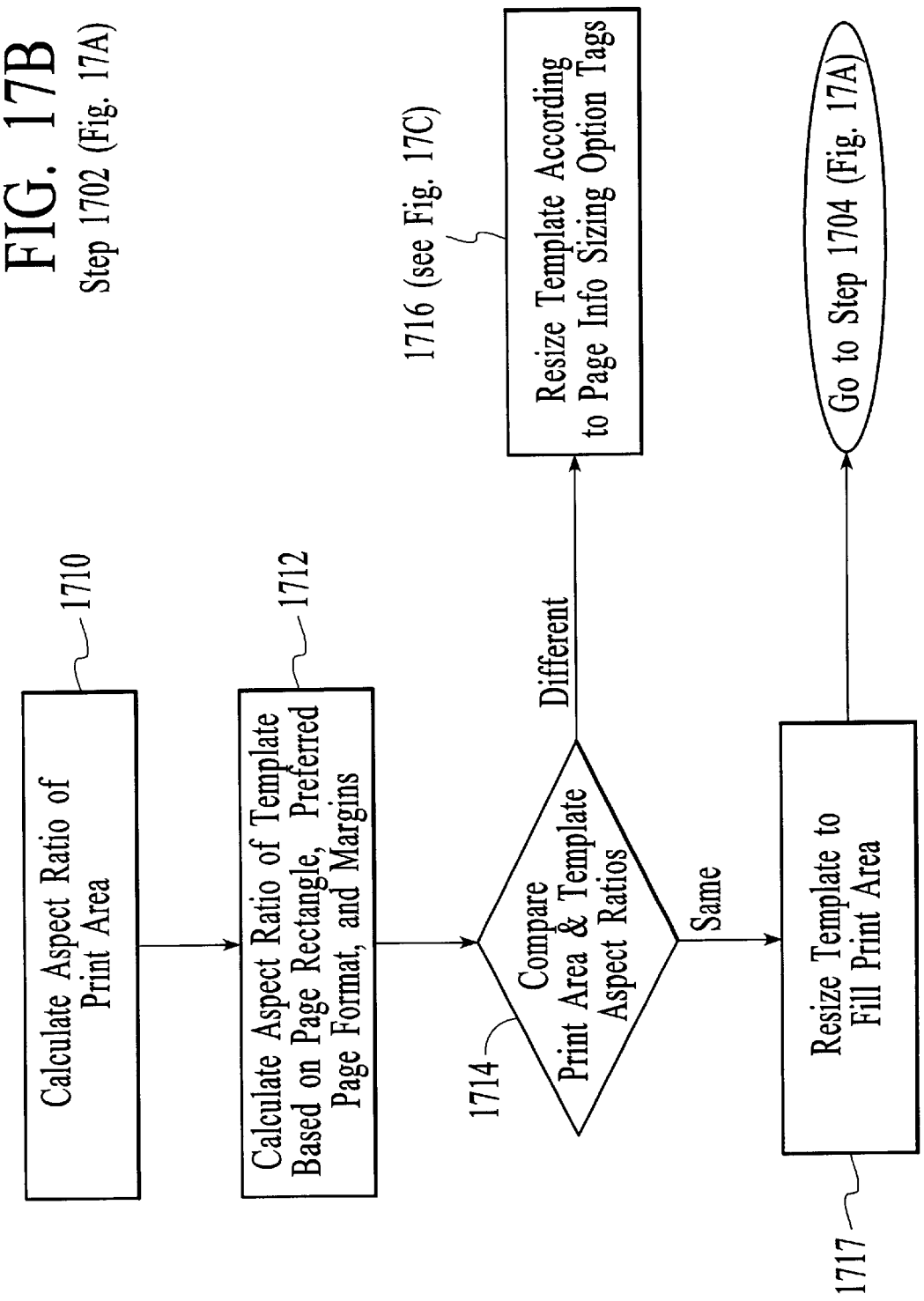

FIG. 17B is a flow chart illustrating in more detail the resizing of the template and layout in step 1702 of FIG. 17A. In the resizing, first the aspect ratio of the print area is calculated, via step 1710. Next, the aspect ratio of the template is calculated based on the Page Rectangle (default target rectangle into which the template is designed to fit), Preferred Page Format, and Margins in the Page Information, via step 1712. The Page Rectangle, Preferred Page Format, and the Margins together define the print area for which the template was designed. These two aspect ratios are compared, via step 1714. If they are the same, then the template is resized to fill the print area, via step 1717. If they are different, then the template is resized according to the Page Information Sizing Option tags, via step 1716.

The resizing of the template according to the Sizing Option tags (step 1716) is illustrated in more detail in the flow chart in FIG. 17C. If the Fit Within tag is used, via step 1718, then the template is resized to fit the print area without changing its aspect ratio, via step 1720. If the Fill and Clip tag is used, via step 1724, then the template is resized to fill the print area without changing its aspect ratio but its excesses are clipped, via step 1726. It either the Fit Within or Fill and Clip tags are used, the template is also justified inside the print area according to the Horizontal and Vertical Justification tags, via step 1722. If the Fill tag is used, via step 1728, then the template is resized to fill the layout area by changing its aspect ratio, via step 1730. Horizontal and vertical Justifications are not necessary in this case.

Once the resizing of the template and layout is performed, the coordinates for each target rectangle in the Layout List is set up (step 1704, FIG. 17A). FIG. 17D is a flow chart illustrating the details of the set up. First, the operating system checks to see if there is at least one target rectangle in the Layout List, via step 1732. If so, then the image planes and foreground planes are positioned and resized along with the template (as described with FIG. 17C) so that each correspond to the location and size of a target rectangle in the Layout List, via step 1736. If not, then the template's target rectangle is associated with each image and foreground plane instead, via step 1734.

After the setup of the coordinates, the operating system checks whether any override tags match the tags in the plane files in the Plane List (step 1705 of FIG. 17A). If they do, then the override tags replaces the tags in the plane files, via step 1706.

After the replacement of the tags in the plane files, or if there are no override tags, the font format is associated with each text area in the Font Format, via step 1708, by associating the font format with a target rectangle.

Figure 18A:
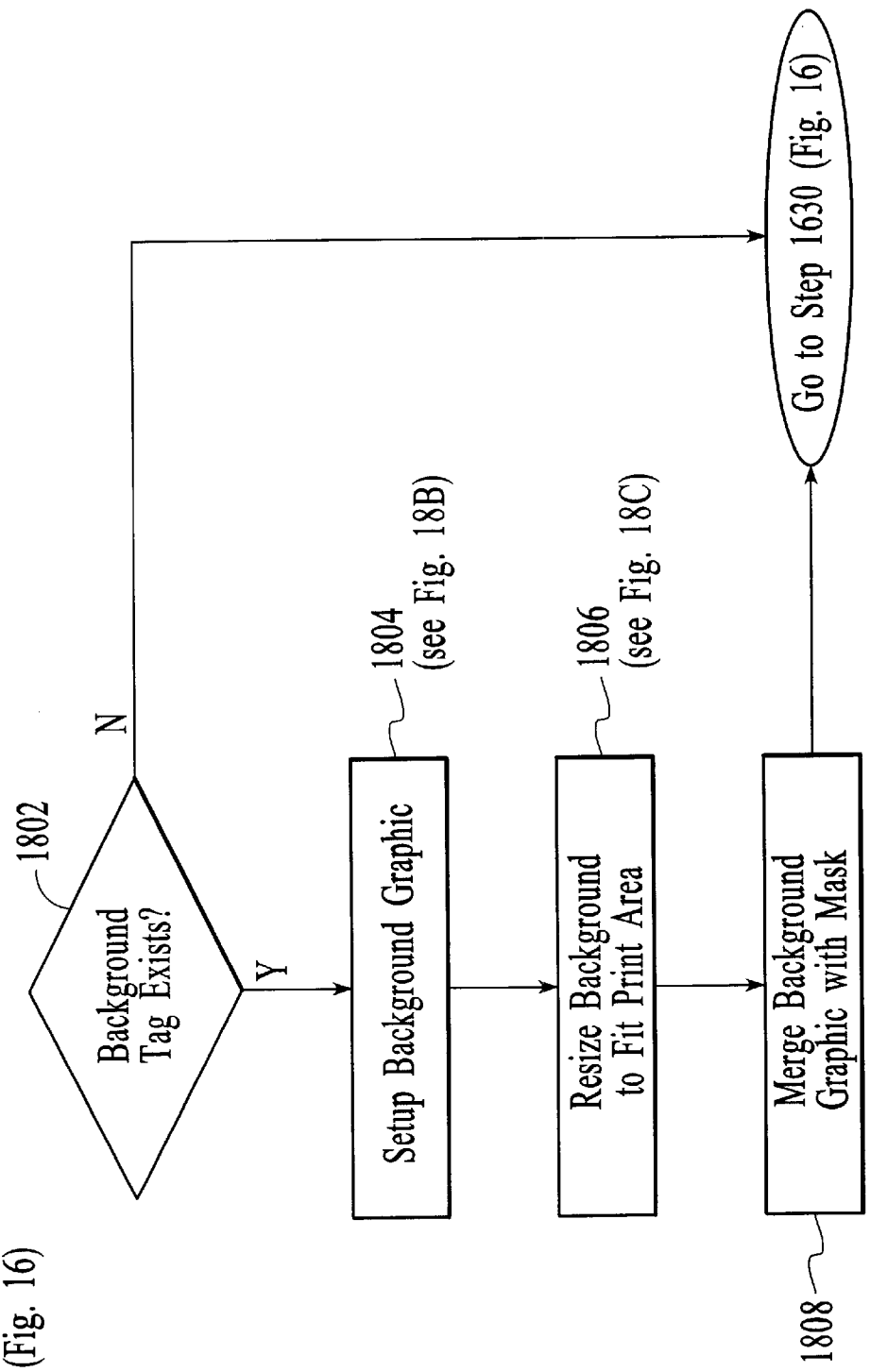
FIGS. 18A–18C are flow charts illustrating the details of the rendering of a background plane in the preferred embodiment of the present invention.
Figure 18B:
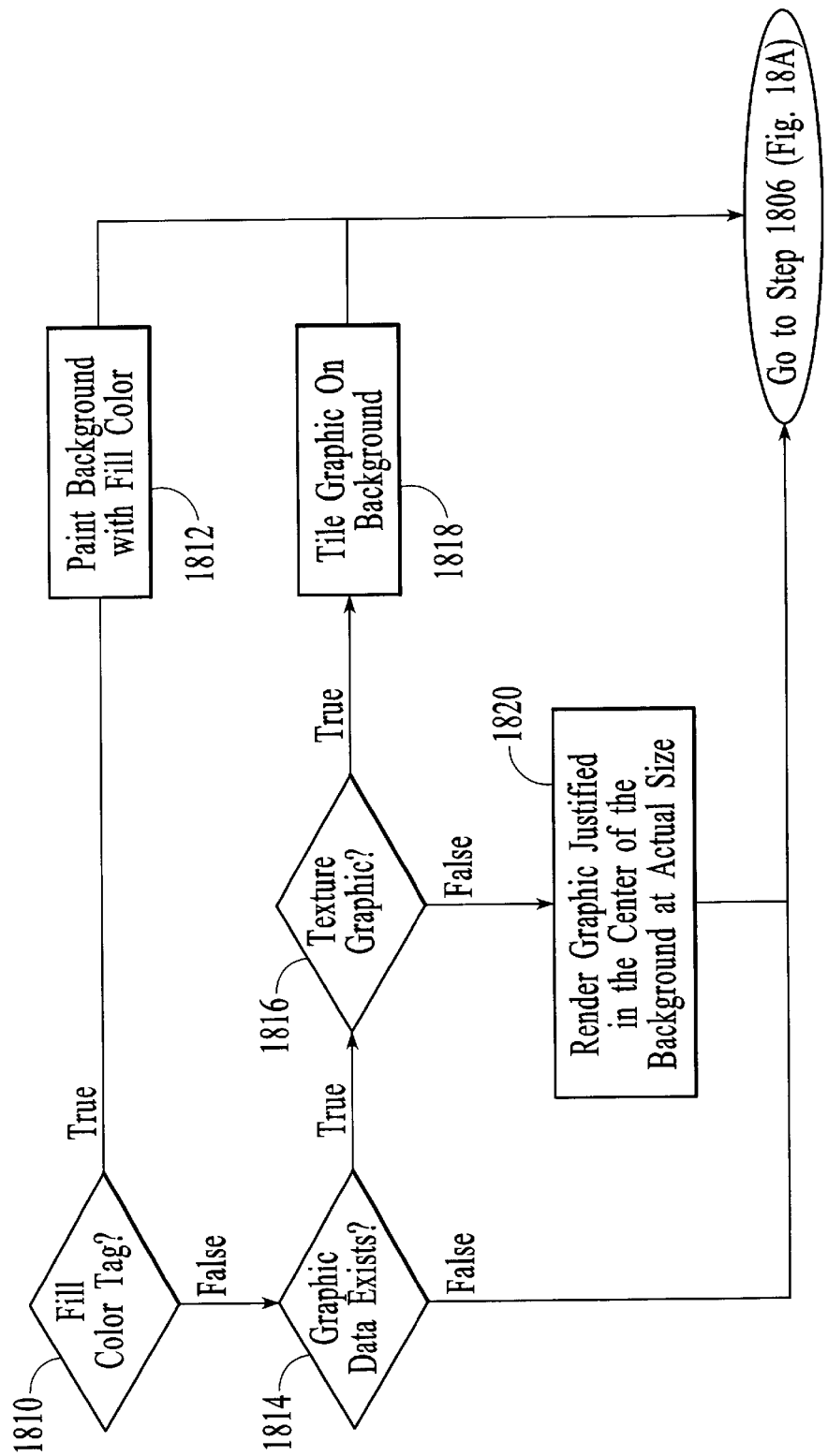
Figure 18C:
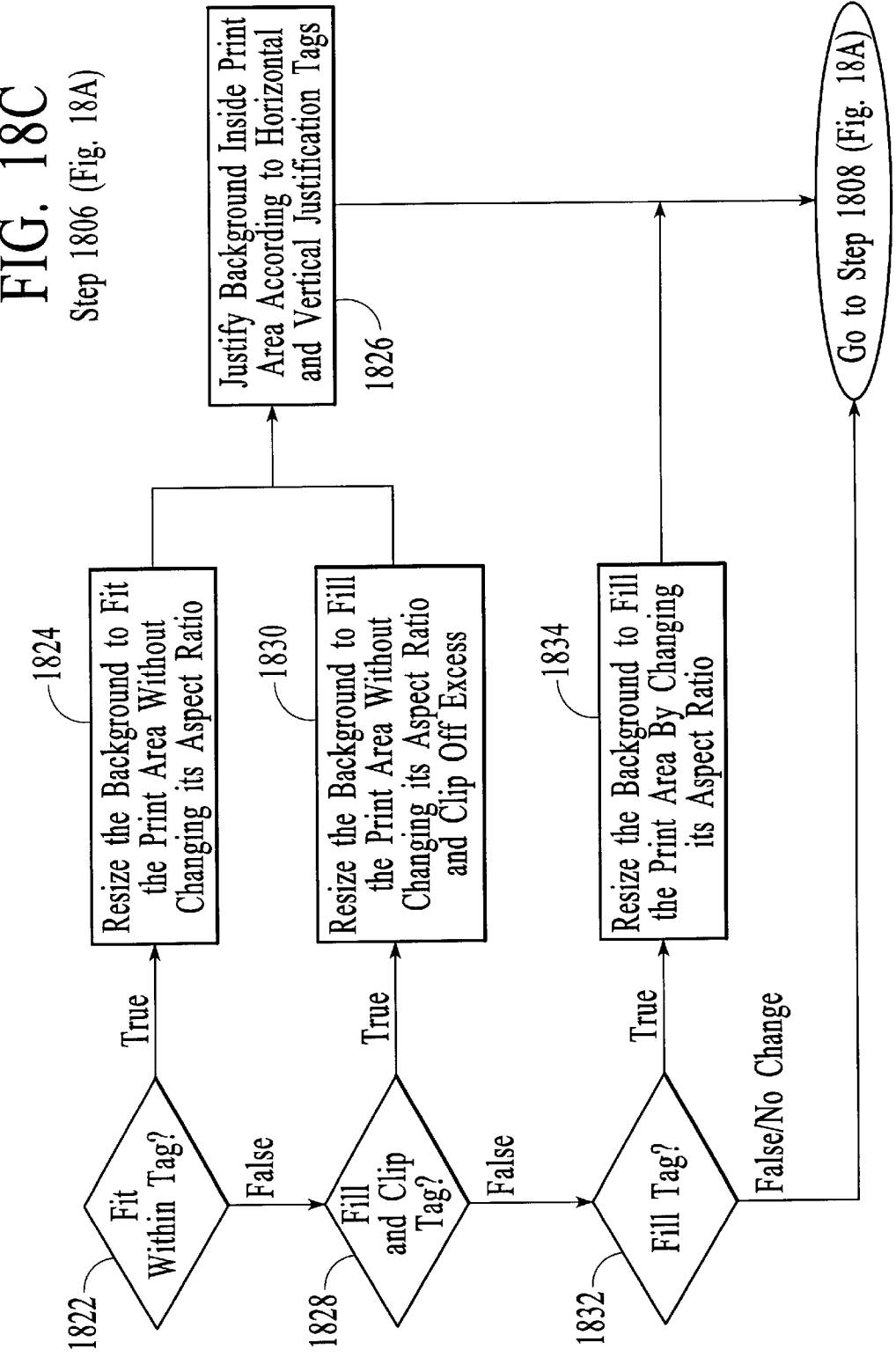

FIGS. 18A through 18C illustrate the details of the operating system's rendering of the background plane (step 1620 of FIG. 16). Before beginning the rendering, the operating system checks if tags for rendering a background exists, via step 1802. If not, the operating system moves on to step 1730 of FIG. 17. If so, then it first sets up the background graphic, via step 1804. Next it resizes the background to fit the print area, via step 1806. Then it merges the background graphic with a mask, if a mask is used, via step 1808.

FIG. 18B is a flow chart illustrating in more detail the set up in step 1804. If a Fill Color tag is used, via step 1810, then the background is painted with the color indicated, via step 1812. If not, the operating system checks whether the tag indicates that graphic data exists for the background, via step 1814. If so, then it checks whether the graphic is a texture, via step 1817. If it is, then the graphic is tiled on the background, via step 1818. If not, then the graphic is rendered justified in the center of the background at actual size, via step 1820.

After the setup of the background graphic, the operating system resizes the background to fit the print area, via step 1806 of FIG. 18A. FIG. 18C is a flow chart illustrating the resizing of the background. The steps depicted are identical to the steps in FIG. 17C except the background instead of the template is resized. The explanation of each step of the resizing will not be duplicated here. After resizing, the background graphic is merged with the mask if one is used, via step 1808 (FIG. 18A).

Figure 19A:
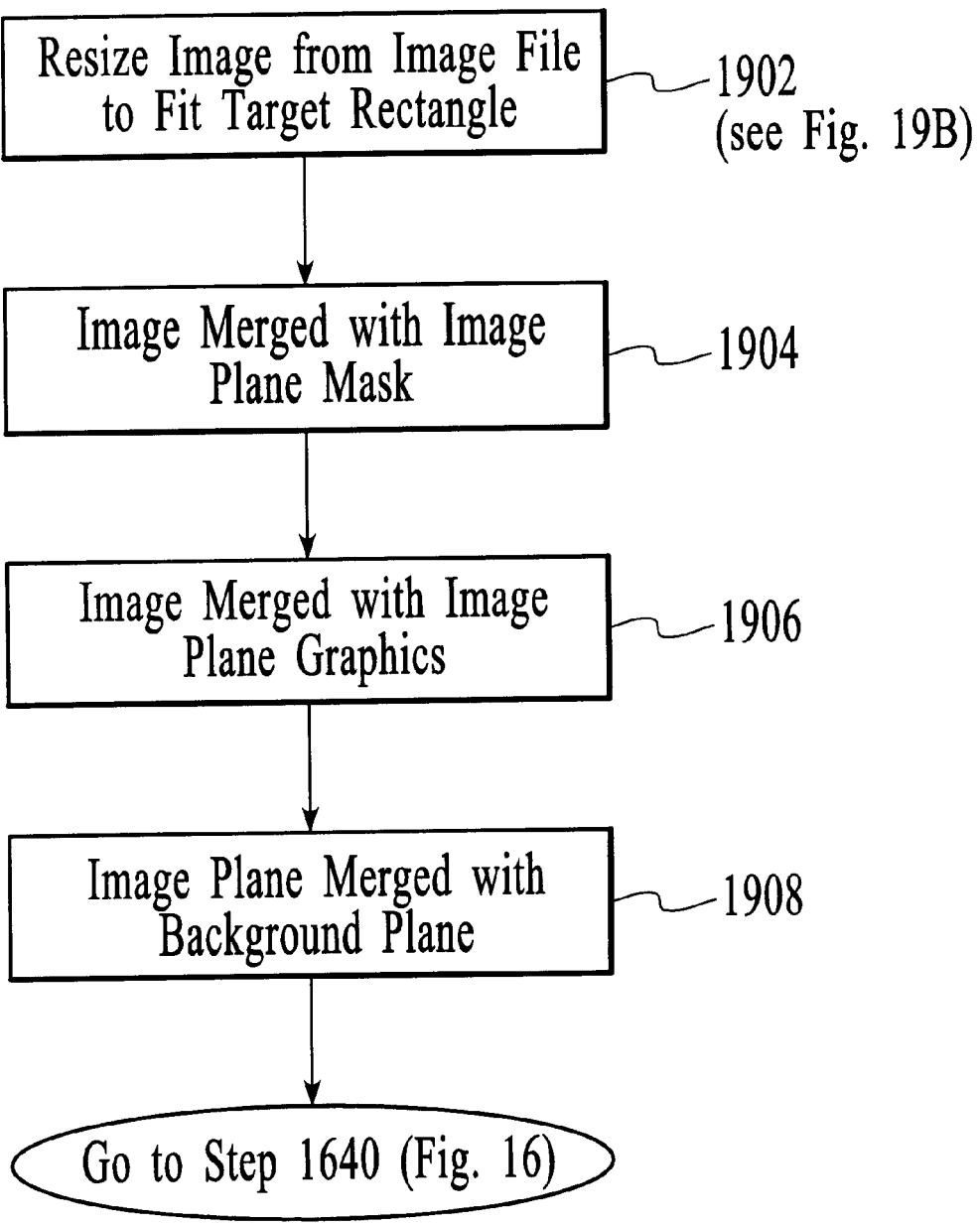

After the rending of the background plane, the image plane is rendered (step 1630 of FIG. 16). FIG. 19A is a flow chart illustrating the details of the rendering of the image plane. First, the image is resized to fit the target rectangle, via step 1902. Next, the image is merged with the image plane mask, if one is used, via step 1904. Next, the image is merged with the image plane graphics, via step 1906. Then, the image plane is merged with the background plane, via step 1908.

FIG. 19B is a flow chart illustrating in more detail the resizing of step 1902. The steps depicted are identical to the steps in FIGS. 17C and 18C except the image rather than the template or the background is resized. The explanation of each step of the resizing will not be duplicated here.

Figure 20:
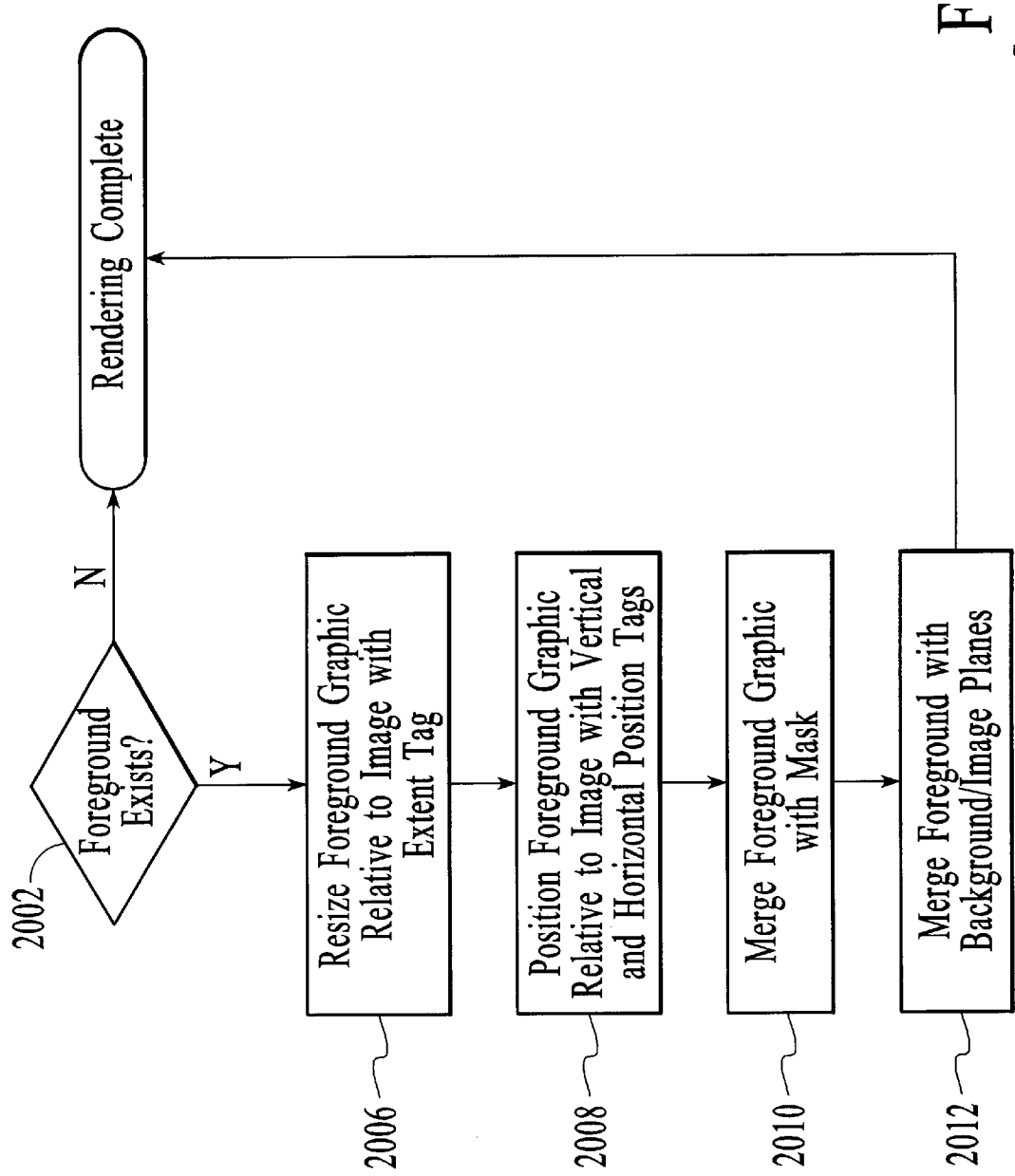
FIG. 20 is a flow chart illustrating the details of the rendering of a foreground plane in the preferred embodiment of the present invention.

After the rendering of the image plane with the image file, the operating system renders the foreground plane (step 1640 of FIG. 16). FIG. 20 is a flow chart illustrating this rendering. For each foreground plane, the operating system first checks whether tags exist for the foreground plane, via step 2002. If not, then the rendering is complete. If so, then the foreground graphic is resized relative to the image according to the Extent tag, if one is used, via step 2006. Next, the foreground graphic is positioned relative to the image according to the vertical and horizontal position tags, via step 2008. Next, the foreground graphic is merged with the mask, if one is used, via step 2010. Then, the foreground is merged with the background and image planes, via step 2012.

Once the operating system finishes with the rendering of the foreground plane and merges it with the background and image planes, the rendering is complete.

A method and system for the creation and use of image templates have been disclosed. This method automates the process of applying templates to images which reduces the required amount of user time for the interface. Its use of tags to store the templates require less storage space. The present invention thus saves the user considerable time and effort in applying templates. It also requires less processing time over manual template creation methods.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for applying a template to an image on a printer, comprising the steps of:
   (a) storing the template in a template file, the template file comprising a plurality of tags, wherein the plurality of tags provides instructions for the application of a plurality of plane files to the image and instructions for automating a process of shaping the image or the template in order to fit them together properly in a print area; and
   (b) applying the template to the image based on the instructions in the tags, wherein the instructions comprise:
   (b1) automatically rendering a first plane of the image,
   (b2) automatically rendering a second plane of the image and combining the second plane with the first plane, and
   (b3) automatically rendering a third plane of the image and combining the third plane with the combined first and second planes.

2. The method in claim 1, wherein the template comprises:
   a first group of tags for the first plane of the image, wherein the first group of tags provides instructions for the application of a first group of plane files to the image; and
   a second group of tags for the second plane of the image, wherein the second group of tags provides instructions for the application of a second group of plane files to the image.

3. The method in claim 2, wherein the template further comprises a third group of tags for the third plane of the image, wherein the third group of tags provides instructions for the application of a third group of plane files to the image.

4. The method in claim 1, wherein the template further comprises:
   page information, wherein the page information comprise hints on a shape of the layout area, sizing options, vertical and horizontal justifications, and margins;
   a layout list, wherein the layout list comprises position and dimension information on a plurality of target rectangles;
   a plane list, wherein the plane list provides instructions for the application of a plurality of plane files to the image;
   a font format list, wherein the font format list comprises information on font formats for text fields; and
   a thumbnail.

5. A system for applying a template to an image, comprising:
   a printing output device comprising a memory and template software;
   means for providing the image; and
   the template stored in a template file in the memory of the printing output device, the template file comprising a plurality of tags, wherein the plurality of tags provides instructions for the application of a plurality of plane files to the image and instructions for automating a process of shaping the image or the template in order to fit them together properly in a print area, wherein the template is applied to the image by the template software based on the instructions in the tags, wherein the instructions comprise:
   automatically rendering a first plane of the image,
   automatically rendering a second plane of the image and combining the second plane with the first plane, and
   automatically rendering a third plane of the image and combining the third plane with the combined first and second planes.

6. The system of claim 5, wherein the template comprises:
   a first group of tags for the first plane of the image, wherein the first group of tags provides instructions for the application of a first group of plane files to the image; and
   a second group of tags for the second plane of the image, wherein the second group of tags provides instructions for the application of a second group of plane files to the image.

7. The system of claim 6, wherein the template further comprises a third group of tags for the third plane of the image, wherein the third group of tags provides instructions for the application of a third group of plane files to the image.

8. The system of claim 5, wherein the template further comprises:
   page information, wherein the page information comprise hints on a shape of the print area, vertical and horizontal justifications, sizing options, and margins;
   a layout list, wherein the layout list comprises position and dimension information on a plurality of target rectangles;

a font format list, wherein the font format list comprises information on font formats for text fields; and a thumbnail.

9. A method for applying a template to an image on a printer, comprising the steps of:
   (a) storing the template in a template file, the template file comprising a plurality of tags, the plurality of tags providing instructions for the application of a plurality of plane files to the image and instructions for automating a process of shaping the image or the template in order to fit them together properly in a print area, wherein the template further comprises:
      a first group of tags for automatically rending a foreground plane of the image;
      a second group of tags for automatically rending an image plane of the image and for automatically combining the foreground plane with the image plane; and
      a third group of tags for automatically rendering a background plane of the image and for automatically combining the background plane with the combined foreground and image planes; and
   (b) applying the template to the image based on the tags.

10. The method in claim 9, wherein the template further comprises:
   page information, wherein the page information comprise hints on a shape of the layout area, vertical and horizontal justifications, sizing options, and margins;
   a layout list, wherein the layout list comprises position and dimension information on a plurality of target rectangles;
   a plane list, wherein the plane list provides instructions for the application of the plurality of plane files to the image;
   a font format list, wherein the font format list comprises information on font formats for text fields; and
   a thumbnail.

11. A computer readable medium in a printer with computer instructions for applying a template to an image, comprising the computer instructions for:
   (a) storing the template in a template file, the template file comprising a plurality of tags, wherein the plurality of tags provides instructions for the application of a plurality of plane files to the image and instructions for automating a process of shaping the image or the template in order to fit them together properly in a print area; and
   (b) applying the template to the image based on the instructions in the tags, wherein the instructions comprise instructions for:
      (b1) automatically rendering a first plane of the image,
      (b2) automatically rendering a second plane of the image and combining the second plane with the first plane, and
      (b3) automatically rendering a third plane of the image and combining the third plane with the combined first and second planes.

12. The method of claim 1, wherein the applying step (b) further comprises:
   (b4) automatically reading the plurality of tags, wherein the automatically reading step (b4) comprises:
      (b4i) resizing the template and a layout for a paper format based on a page information;
      (b4ii) setting up coordinates for each target rectangle in a layout list;
      (b4iii) replacing tags in the plurality of plane files with override tags, if the override tags match tags in the plurality of plane files; and
      (b4iv) associating a font format for each text area in a font format list.

13. The method of claim 12, wherein the resizing step (b4i) comprises:
   (b4iA) calculating an aspect ratio of a print area;
   (b4iB) calculating an aspect ratio of the template based on a page rectangle, a preferred page format, and margins;
   (b4iC) resizing the template according to page information sizing option tags, if the print area is different from the aspect ratio of the template; and
   (b4iD) resizing the template to fill the print area, if the print area is the same as the aspect ratio of the template.

14. The method of claim 13, wherein the resizing step (b4iC) comprises:
   (b4iCI) resizing the template to fit the print area without changing the aspect ratio of the template, if a fit within tag is used;
   (b4iCII) resizing the template to fill the print area without changing the aspect ratio of the template and clipping an excess of the template, if a fit and clip tag is used;
   (b4iCIII) resizing the template to fill the print area by changing the aspect ratio of the template if a fill tag is used; and
   (b4iCIV) justifying the template inside the print area according to a horizontal and vertical justification tags, if the fit within tag or the fit and clip tag is used.

15. The method of claim 12, wherein the replacing step (b4iii) comprises:
   (b4iiiA) associating the second plane and the third planes with a target rectangle in a layout list, if at least one target rectangle is in the layout list; and
   (b4iiiB) associating a rectangle of the template with the second and third planes, if there is no target rectangle in the layout list.

16. The method of claim 1, wherein the automatically rendering step (b1) comprises:
   (b1i) setting up a background graphic, if background tags exist;
   (b1ii) resizing the background graphic to fit a print area; and
   (b1iii) merging the background graphic with a mask.

17. The method of claim 16, wherein the setting step (b1i) comprises:
   (b1iA) painting the background graphic with a fill color, if a fill color tag is used;
   (b1iB) tiling the background graphic with a tile graphic, if a texture graphic is used; and
   (b1iC) rendering the background graphic in a center of the first plane if a graphic data exist.

18. The method of claim 16, wherein the resizing step (b1ii) comprises:
   (b1iiA) resizing the background graphic to fit the print area without changing an aspect ratio of the background graphic, if a fit within tag is used;
   (b1iiB) resizing the background graphic to fill the print area without changing the aspect ratio of the background graphic and clipping an excess of the background graphic, if a fit and clip tag is used;
   (b1iiC) resizing the background graphic to fill the print area by changing the aspect ratio of the background graphic if a fill tag is used; and
   (b1iiD) justifying the background graphic inside the print area according to a horizontal and vertical justification tags, if the fit within tag or the fit and clip tag is used.

19. The method of claim 1, wherein the automatically rendering step (b2) comprises:
- (b2i) resizing an image from an image file to fit a target rectangle of the second plane;
- (b2ii) merging the image with an image plane mask;
- (b2iii) merging the image with image plane graphics;
- (b2iv) merging the image plane with the first plane.

20. The method of claim 19, wherein the resizing step (b2i) comprises:
- (b2iA) resizing the image to fit a print area without changing an aspect ratio of the image, if a fit within tag is used;
- (b2iB) resizing the image to fill the print area without changing the aspect ratio of the image and clipping an excess of the image, if a fit and clip tag is used;
- (b2iC) resizing the image to fill the print area by changing the aspect ratio of the image if a fill tag is used; and
- (b2iD) justifying the image inside the print area according to a horizontal and vertical justification tags, if the fit within tag or the fit and clip tag is used.

21. The method of claim 1, wherein the automatically rending step (b3) comprises:
- (b3i) resizing a foreground graphic relative to an image in the second plane according to an extent tag;
- (b3ii) positioning the foreground graphic relative to the image according to vertical and horizontal position tags;
- (b3iii) merging the foreground graphic with a mask; and
- (b3iv) merging the foreground graphic with the combined second and first planes.

* * * * *